United States Patent
Singh

(10) Patent No.: US 10,567,909 B2
(45) Date of Patent: Feb. 18, 2020

(54) WIRELESS DISSEMINATION OF ENVIRONMENT AWARE INFORMATION

(75) Inventor: Gurvinder Singh, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1979 days.

(21) Appl. No.: 11/977,001

(22) Filed: Oct. 22, 2007

(65) Prior Publication Data

US 2008/0109317 A1    May 8, 2008

Related U.S. Application Data

(60) Provisional application No. 60/863,093, filed on Oct. 26, 2006.

(51) Int. Cl.
*H04W 4/021* (2018.01)
*G06Q 30/02* (2012.01)

(52) U.S. Cl.
CPC ........ *H04W 4/022* (2013.01); *G06Q 30/0277* (2013.01)

(58) Field of Classification Search
USPC ...................................... 705/14.58
See application file for complete search history.

(56) References Cited

U.S. PATENT DOCUMENTS

| | | | |
|---|---|---|---|
| 6,452,498 B2 | 9/2002 | Stewart | |
| 6,571,279 B1* | 5/2003 | Herz et al. | 709/217 |
| 7,756,534 B2* | 7/2010 | Anupam et al. | 455/466 |
| 7,822,661 B1* | 10/2010 | Chu et al. | 705/35 |
| 2001/0054001 A1 | 12/2001 | Robinson | |
| 2002/0086663 A1 | 7/2002 | Tang et al. | |
| 2005/0024189 A1* | 2/2005 | Weber | 340/425.5 |
| 2005/0096013 A1* | 5/2005 | Lehikoinen et al. | 455/411 |
| 2006/0149905 A1 | 7/2006 | Park et al. | |
| 2007/0105536 A1* | 5/2007 | Tingo, Jr. | 455/414.1 |
| 2007/0192409 A1* | 8/2007 | Kleinstern et al. | 709/203 |

FOREIGN PATENT DOCUMENTS

KR    10-2006-0072672 A    6/2006

* cited by examiner

*Primary Examiner* — E Carvalho

(57) ABSTRACT

The method and system disclosed herein enables non-spamming dissemination of environment and proximity aware information and advertisements to a user of a mobile device. The method disclosed herein provides a client application on the mobile device. The client application detects the presence of base station sensor devices in proximity to the user. Service offerings information of vendors is then transferred to the client application. The client application categorizes the service offerings information into multiple categories. The client application communicates with the base station sensor devices to receive business information and advertisements of the vendors based on categories selected by the user. Environmental sensors capture environmental data of a region surrounding the base station sensor devices. The business information and advertisements are correlated with the environmental data and local time data. The correlated information and advertisements are then transferred to the client application.

18 Claims, 18 Drawing Sheets

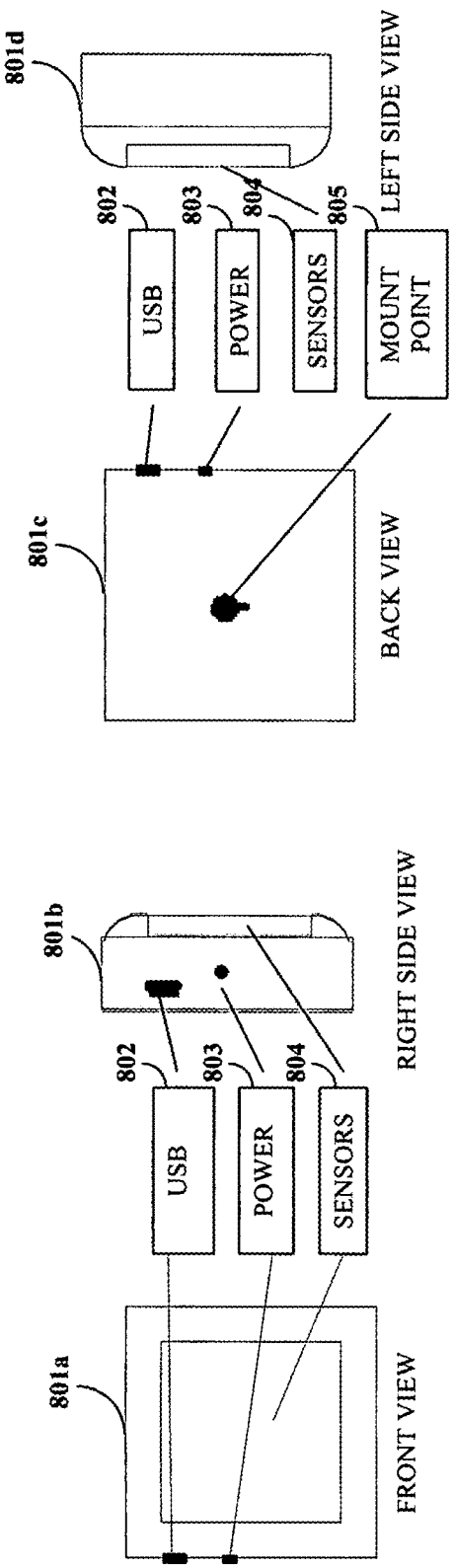
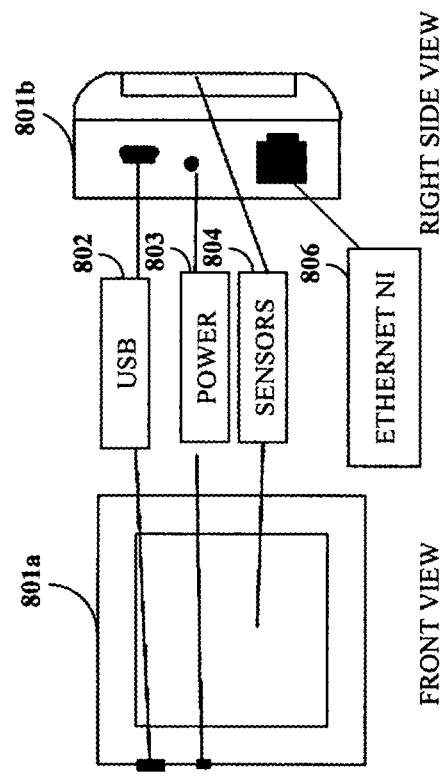

1. Bluetooth Radio based device with on board memory and sensors running Server Software 2. Wi-Fi Radio based device with on Board memory and sensors running Server Software 3. Single device with both Bluetooth and Wi-Fi Radios and on board memory and sensors running Server Software

WIRELESS DISSEMINATION OF
ENVIRONMENT AWARE INFORMATION

CROSS REFERENCE TO THE RELATED
APPLICATION

This application claims the benefit of provisional patent application U.S. 60/863,093, titled "Wireless Advertising and Information Sensor", filed on Oct. 26, 2006 in the United States Patent and Trademark Office.

BACKGROUND

This invention, in general, relates to wireless technology. More particularly, this invention relates to dissemination of environment and proximity aware information and advertisements to a mobile device user.

In existing methods of mobile advertising, mobile advertisements including banner advertisements, short message service advertisements, etc., are sent to a mobile device of a user. These mobile advertisements may be not be relevant to the mobile device user and may go unnoticed. The user may prefer to obtain information and advertisements about the various events and businesses in the vicinity of the user. For example, when the mobile device user is in the vicinity of a cinema, the user may need information about movie trailers, movie reviews, and movie listings. Business organizations would therefore need to advertise their products and services to mobile device users in the vicinity of their businesses. Therefore, there is a need for business organizations to disseminate environment and proximity aware information and advertisements to the mobile device user in a non-spamming manner.

Business organizations may also prefer to send out advertisements based on environmental conditions, or the time of day. For example, a coffee shop may want to advertise a new café latte advertisement on a cold day, or a restaurant may want to send out a lunch menu during lunch time to the mobile device user. Therefore, there is a need for a business organization to disseminate environment and proximity aware information and advertisements to the mobile device user. Hence, there is an unmet need for a method and system to disseminate environment and proximity aware information and advertisements to the mobile device user.

SUMMARY OF THE INVENTION

The method and system disclosed herein addresses the above stated needs for non-spamming based dissemination of environment and proximity aware information and advertisements to a user of a mobile device. The method and system disclosed herein determines the proximity of the mobile device user to a plurality of base station sensor devices, and the environmental conditions of a region surrounding the mobile device user in order to disseminate environment and proximity aware information and advertisements to the mobile device user.

The method and system disclosed herein provides a client application on the mobile device of the user. The client application detects the presence of base station sensor devices in proximity to the mobile device user. The base station sensor devices are one of stand-alone base station devices and beacon devices with wireless capabilities. The client application detects the presence of the base station sensor devices using one of a Bluetooth wireless protocol, a wireless fidelity (Wi-Fi) protocol, and Worldwide Interoperability for Microwave Access (WiMAX) technology. High level information of service offerings of vendors in the vicinity of the user is then transferred to the client application. The information of the service offerings of the vendors is transferred to the client application from the standalone base station devices using one of Bluetooth wireless protocol, Wi-Fi protocol, and WiMAX technology. In the case of the beacon devices, the client application transfers address information of the detected beacon devices to a data server using a wireless internet service based on one of global system for mobile communication (GSM) technology and code division multiple access (CDMA) technology. The information of the service offerings of the vendors is then transferred to the client application from the data server using the wireless internet service based on one of GSM technology and CDMA technology.

The client application categorizes the transferred information into multiple categories. The categories are listed and displayed on a graphical user interface of the client application. The mobile device user selects one or more of the categories in the client application. The client application then communicates with the base station sensor devices to receive business information and advertisements of the vendors based on the selected categories. Vendors configure business information and advertisements using a business information configuration tool. Environmental sensors present on the base station sensor devices capture environmental data of a region surrounding the base station sensor devices. In the case of the beacon devices, the client application transfers encoded sensor information comprising the environmental data to the data server.

The business information and advertisements of the vendors are then correlated with the captured environmental data and local time data and transferred to the client application based on the selected categories. The business information and advertisements are correlated with the environmental data in the standalone base station devices and transferred to the client application by one of a Bluetooth wireless protocol, a Wi-Fi protocol, and WiMAX technology. In the case of the beacon devices, the business information and advertisements are correlated in the data server and transferred from the data server to the client application using the wireless internet service based on one of GSM technology and CDMA technology.

The method and system disclosed herein also enables non-spamming dissemination of environment and proximity aware information and advertisements to the mobile device user using a global positioning system (GPS) on the mobile device. The dissemination of environment and proximity aware information and advertisements to the user of the mobile device with GPS capabilities is referred to as a GPS based service. The user of the mobile device with GPS capabilities configures a proximity range on the client application for obtaining service offerings information from vendors of interest in the proximity range. The client application transfers GPS coordinates of the mobile device to the data server using a wireless internet service based on one of GSM technology and CDMA technology. The GPS coordinates are reverse geocoded on the data server to determine the location of the mobile device user. The location and the proximity range are used by the data server to determine the vendors in proximity to the mobile device user. The service offerings information and the correlated information and advertisements of the vendors are then transferred to the client application from the data server using a wireless internet service based on one of GSM technology and CDMA technology.

The transfer of information of service offerings of vendors may be initiated by a request from the mobile device user in an active pull mode of operation, or initiated automatically by the client application in a passive pull mode of operation without user intervention. In the passive pull mode of operation, solicitation messages are sent from the base station sensor devices to the client application and filtered based on filter criteria configured on the client application. The client application notifies the mobile device user of the availability of the filtered solicitation messages, thereby enabling the mobile device user to request for additional information from the base station sensor devices.

The dissemination of environment and proximity aware information and advertisements to the mobile device user may also be performed in a push mode of operation. In the push mode, proximity sensors and motion sensors on the base station sensor devices detect the presence of the mobile device user in proximity to the base station sensor devices. Environmental sensors on the base station sensor devices capture environmental data of a region surrounding the base station sensor devices. In the case of the beacon devices, the client application transfers the encoded sensor information comprising the environmental data to the data server.

In the case of standalone devices, the business information and advertisements configured by the vendors are stored on the stand-alone base station devices. The configured information and advertisements are correlated with the captured environmental data and the local time data and transferred to the client application. The transfer of the correlated information and advertisements to the mobile device is performed using a Bluetooth object push profile for Bluetooth compatible devices and a hypertext transfer protocol for Wi-Fi based devices.

In the case of the beacon devices and the GPS based service, the business information and advertisements configured by the vendors are stored on the data server. The configured information and advertisements are correlated with the real-time environmental data and the local time data and transferred to the client application. The transfer of the correlated information and advertisements to the mobile device is performed using one of a hypertext transfer protocol (HTTP), an extensive markup language-remote procedure call protocol (XML-RPC), and a wireless application protocol (WAP) using a wireless internet service based on one of GSM technology and CDMA technology.

The method and system disclosed herein further enables vendors to collect information from mobile device users in proximity to the base station sensor devices and from users of mobile devices with global positioning system capabilities. The vendors may also deliver text files, image files, audio files, video files, wireless application protocol files, and hypertext markup language files to the mobile device from the standalone base station devices or the data server. Moreover, the method and system disclosed herein enables the mobile device user to gather, view, or retain information about a business for later use.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 8A-8C illustrate the different views of the base station sensor device and the placement of the sensors on the base station sensor device.

DETAILED DESCRIPTION OF THE INVENTION

Figure 1:
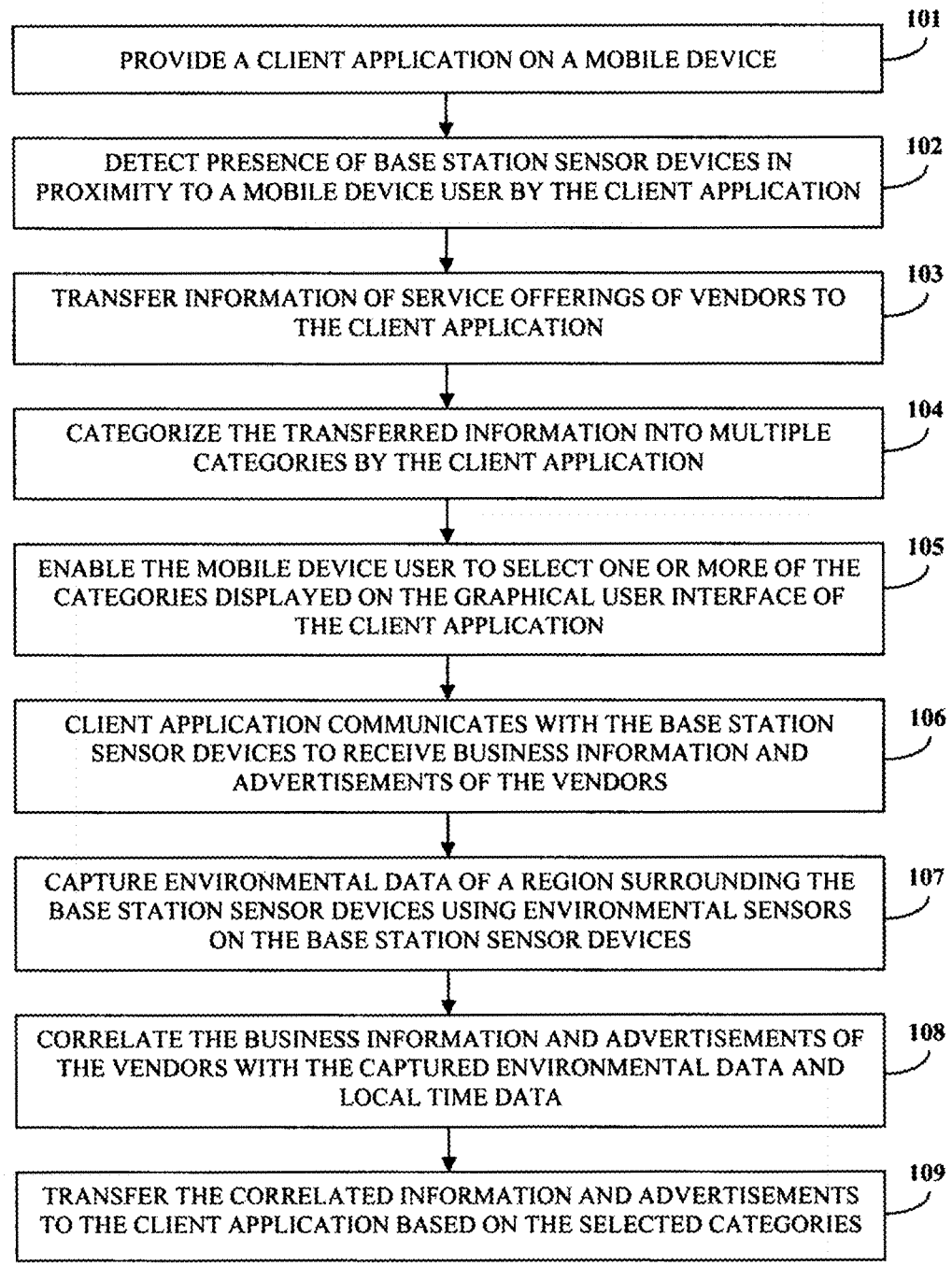
FIG. 1 illustrates a method of non-spamming dissemination of environment and proximity aware information and advertisements to a mobile device user.

FIG. 1 illustrates a method of non-spamming dissemination of environment and proximity aware information and advertisements to a mobile device user 701. The method disclosed herein provides 101 a client application 702 on the mobile device of the user 701. The client application 702 detects 102 the presence of a plurality of base station sensor devices 2302 in proximity to the mobile device user 701. The base station sensor devices 2302 are one of stand-alone base station devices 703 and beacon devices 1501 with wireless capabilities. The standalone base station devices 703 and the beacon devices 1501 are at least one of Bluetooth® radio devices, wireless fidelity (Wi-Fi) radio devices, Worldwide Interoperability for Microwave Access (WiMAX) radio devices, and a combination thereof. The client application 702 detects the presence of the base station sensor devices 2302 using one of a Bluetooth® wireless protocol, a wireless fidelity (Wi-Fi) protocol, and Worldwide Interoperability for Microwave Access (WiMAX) technology.

Figure 9:
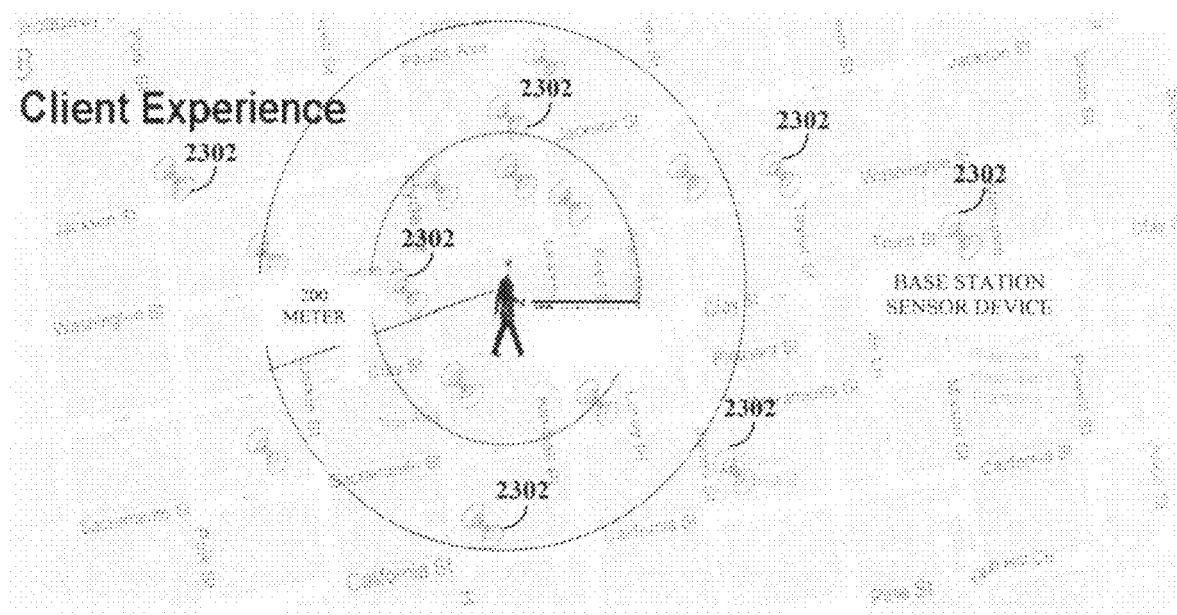
FIG. 9 exemplarily illustrates a mobile device user in proximity to multiple base station sensor devices.

The client application 702 further identifies and discards non-base station sensor devices from a plurality of devices with Bluetooth, Wi-Fi, and WiMAX capabilities. In the case of beacon devices 1501, the client application 702 transfers address information of the detected beacon devices 1501 to a data server 1502 using a wireless internet service based on one of global system for mobile communication (GSM) technology and code division multiple access (CDMA) technology. The address information comprises a service set identifier (SSID) and media access control (MAC) address information. The address information is used to determine proximity of the mobile device user 701 to the respective beacon devices 1501. The mobile device user 701 in proximity to multiple base station sensor devices 2302 is exemplarily illustrated in FIG. 9.

High level information of service offerings of vendors is then transferred 103 to the client application 702. The vendors may be at least one of businesses, marketing groups, billboard owners, shop owners, club owners, bar owners, restaurant owners, real estate sellers, street vendors, street performers, airports, ball parks, railway stations, museums, historical sites, etc. The service offerings information of the vendors is transferred to the client application 702 from the standalone base station devices 703 by one of a Bluetooth wireless protocol, a Wi-Fi protocol, and WiMAX technology. In the case of the beacon devices 1501, the service offerings information of the vendors is transferred to the client application 702 from the data server 1502 using a wireless internet service based on one of GSM technology and CDMA technology.

Bluetooth mobile devices do not require the recipient device to be in the line of sight of the base station sensor devices 2302 provided the received transmission has sufficient power at the recipient device. The base station sensor devices 2302 may also communicate with the mobile devices using an infrared data association (IrDA) protocol and an assisted global positioning system (GPS) service. The IrDA protocol is a line of sight protocol and requires the mobile devices to be in the line of sight of the base station sensor devices' 2302 IrDA connection. In the case of the assisted GPS service, the proximity range of the mobile device user 701 may be adjusted to ranges such as 50 meters, 100 meters, 200 meters, etc., to identify the point of interests in the proximity range.

The client application 702 categorizes 104 the transferred information into multiple categories. For example, the categories may include restaurant categories, night club categories, retail categories, etc. The categories are listed and displayed on a graphical user interface (GUI) 702a of the client application 702. The mobile device user 701 may select 105 one or more of the categories displayed on the GUI 702a. The client application 702 then communicates 106 with the base station sensor devices 2302 to receive business information and advertisements of the vendors based on the selected categories. The vendors configure the business information and advertisements using a business information configuration tool 703c as illustrated in FIGS. 14A-14D. In the case of the stand-alone base station devices 703, the business information and advertisements configured by the vendors are stored on the standalone base station devices 703. In the case of the beacon devices 1501 and the GPS based service, the business information and advertisements configured by the vendors are stored on the data server 1502.

Environmental sensors 703b present on the base station sensor devices 2302 capture 107 environmental data of a region surrounding the base station sensor devices 2302. The environmental sensors 703b comprise temperature sensors, pressure sensors, humidity sensors, light sensors, an internal clock 1102 and a combination thereof. The internal clock 1102 is used to determine the local time. The environmental data comprises the time of day, time duration of the presence of the mobile device user 701 in proximity to the base station sensor devices 2302, and environmental conditions including weather conditions and atmospheric pressure. In the case of the beacon devices 1501, the client application 702 transfers encoded sensor information comprising the environmental data to the data server 1502. Environmental data and local time data may also be obtained by the data server 1502 from a real time location weather database.

The business information and advertisements of the vendors are then correlated 108 with the captured environmental data and local time data. The correlation is based on time of day, time duration of presence of the mobile device user 701 in proximity to the base station sensor devices 2302, and environmental conditions including weather conditions and atmospheric pressure. The business information and advertisements are correlated in the stand-alone base station devices 703 and transferred 109 from the stand-alone base station devices 703 by one of a Bluetooth wireless protocol, a Wi-Fi protocol, and WiMAX technology. In the case of the beacon devices 1501 and the GPS based service, the business information and advertisements are correlated in the data server 1502 and transferred 109 directly from the data server 1502 using the wireless internet service based on one of GSM technology and CDMA technology. The correlated information and advertisements are transferred to the client application 702 based on the selected categories.

The method disclosed herein also enables delivery of text files, image files, audio files, video files, wireless application protocol (WAP) files, and hypertext markup language (HTML) files to the mobile device user 701 from the standalone base station devices 703 or the data server 1502. Vendors may also provide information about schedules, prices, history, commentary, editorials, availability, nutrition data with menus, etc., to the mobile device user 701 to promote their businesses. The method disclosed herein further enables vendors to collect information from mobile device users in proximity to the base station sensor devices 2302 and from users of mobile devices with global positioning system capabilities. Vendors collect information from the mobile device user 701 in order to provide improved services to the mobile device user 701. The vendors may use the collected information to target potential customers. The information collected from the mobile device user 701 includes user profile information, gender, coupons used by the mobile device user 701, time of usage of the coupons, interests, preferences, files downloaded by the mobile device user 701, types of media, phone numbers, electronic mail (email) addresses, etc. Moreover, the method disclosed herein enables the mobile device user 701 to gather, view, or retain information about a business for later use.

Figure 17:
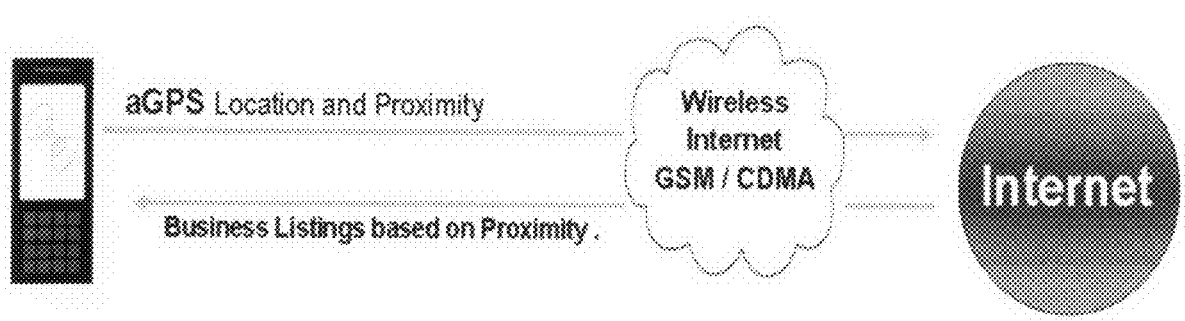
FIG. 17 illustrates a global positioning system implementation of disseminating environment and proximity aware information and advertisements to a mobile device user.

The method disclosed herein also enables non-spamming dissemination of environment and proximity aware information and advertisements to the mobile device user 701 using a global positioning system (GPS) on the mobile device. The dissemination of environment and proximity aware information and advertisements to the user of the mobile device with GPS capabilities is referred to as a GPS based service. FIG. 17 illustrates a global positioning system implementation of disseminating environment and proximity aware information and advertisements to a mobile device user 701. The user 701 of the mobile device with GPS capabilities configures a proximity range on the client application 702 for obtaining service offerings information from vendors of interest in the proximity range. The client application 702 transfers GPS coordinates of the mobile device and the proximity range to the data server 1502 using a wireless internet service based on one of GSM technology and CDMA technology. The GPS coordinates are reverse geocoded on the data server 1502 to determine the location of the mobile device user 701. The location and the proximity range are used by the data server 1502 to determine the vendors in proximity to the mobile device user 701. The vendors also provide address information of businesses of the vendors on the data server 1502. The address information is geocoded to determine the vendors located within the proximity range of the mobile device user as configured on the client application 702. The service offerings information and the correlated information and advertisements of the vendors are then transferred to the client application 702 from the data server 1502 using a wireless internet service based on one of GSM technology and CDMA technology.

The mobile device user 701 may interact with the base station sensor devices 2302 in a pull mode, a push mode, or a mailbox mode of operation. In the pull mode of operation, the client application 702 is enabled on the mobile device of the user 701. In the pull mode of operation, the mobile device user 701 needs to load the client application 702 on the mobile device. The client application 702 may then poll or become aware of the presence of the base station sensor devices 2302 in the surrounding area, for example, within 5 meters, 100 meters, or 160 meters, etc., of the mobile device. Once the base station sensor devices 2302 have been identified by the client application 702, the client application 702 may automatically be configured to establish a connection with the base station sensor devices 2302. If the client application 702 has not been automatically configured, the client application 702 may prompt the mobile device user 701 for instructions. Once a connection has been established, the client application 702 downloads the base station sensor device identity and capabilities associated with the base station sensor devices 2302. The client application 702 then displays the received service offerings information of the vendors on the mobile device in different high level categories. For example, the high level categories may include restaurant categories, night club categories, retail categories, etc. The high level categories enable the mobile device user 701 to further interact with the base station sensor device to receive the environment and proximity aware information and advertisements.

In the pull mode of operation, there are two types of pull operations, namely an active pull and a passive pull. The transfer of service offerings information of the vendors may be initiated by a request from the mobile device user 701 in an active pull mode of operation. In the active pull mode, the mobile device user 701 actively solicits the standalone base station devices 703, the beacon devices 1501, or the GPS based service via the client application 702. In the active pull mode, the mobile device user 701 starts the client application 702 and performs "service discovery" using Bluetooth wireless protocol, Wi-Fi protocol, WiMAX, or GPS. Service discovery includes discovery of the standalone base station devices 703, the beacon devices 1501, or the GPS based service. The client application 702 detects the presence of the standalone base station devices 703, the beacon devices 1501, or the GPS based service in proximity to the mobile device user 701. The mobile device user 701 may also solicit additional information from the standalone base station devices 703, the beacon devices 1501, or the GPS based service.

Figure 2:
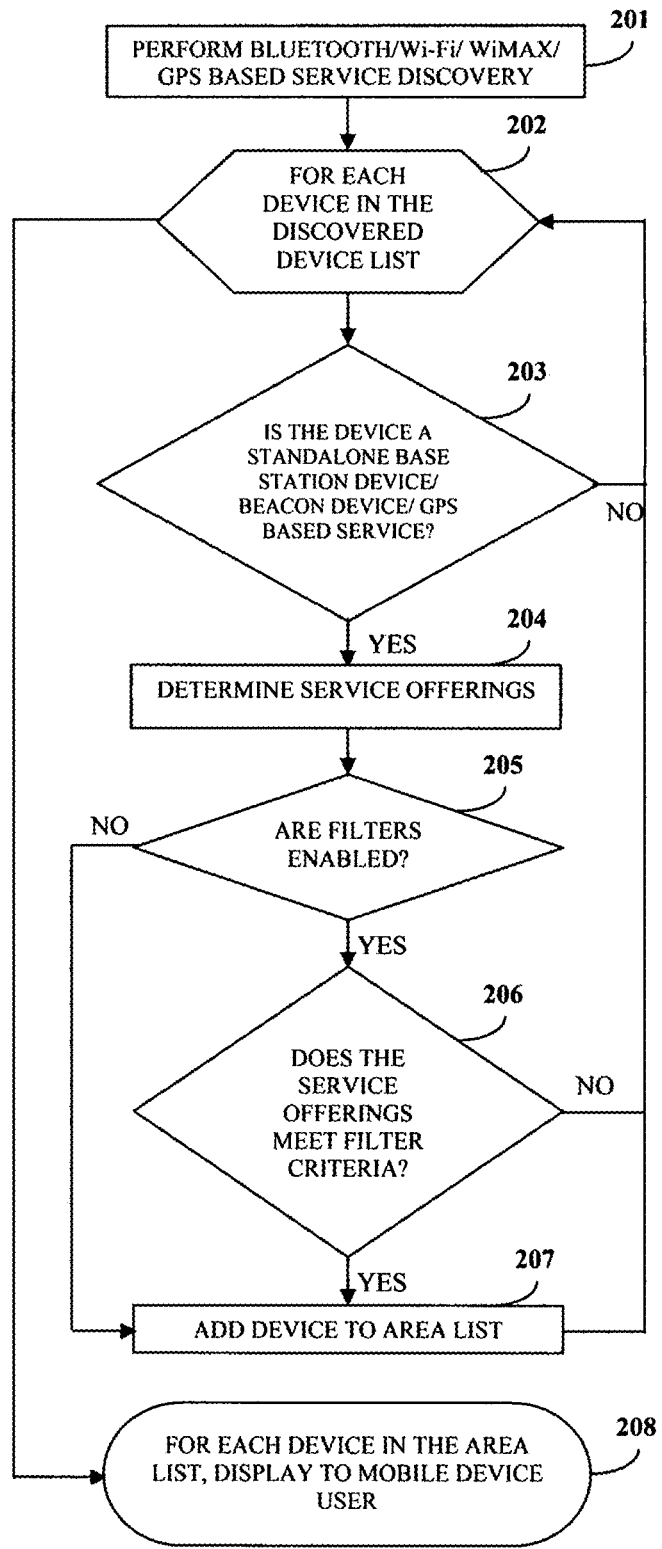
FIG. 2 illustrates a flow chart describing the active pull operation of the client application for receiving environment and proximity aware information and advertisements.

FIG. 2 illustrates a flow chart describing the active pull operation of the client application 702 for receiving environment and proximity aware information and advertisements. The client application 702 performs 201 Bluetooth, Wi-Fi, WiMAX, or GPS based service discovery. During the service discovery, the client application determines the Bluetooth, Wi-Fi, or WiMAX services of the stand-alone base station devices 703, the Bluetooth, Wi-Fi, or WiMAX services of the beacon devices 1501, or the GPS based service in the proximity of the mobile device user 701, and weeds out the non base station sensor devices from a plurality of devices with Bluetooth, Wi-Fi, and WiMAX technology capabilities. For example, the client application 702 may weed out other Bluetooth® mobile phones, Bluetooth® handsets, Bluetooth® computers, and other non base station sensor devices or Bluetooth® devices. After weeding out all the non base station sensor devices, the client application 702 makes a list of the Bluetooth, Wi-Fi, or WiMAX base station sensor devices 2302 and the GPS based service.

Figure 21A:
FIGS. 21A-21B exemplarily illustrate the mobile device user's interactions on the graphical user interface of the client application during viewing of advertisements and configuration of solicitation filters.
Figure 21B:

For each of the base station sensor devices 2302 or the GPS based service in the list 202, the client application 702 determines 203 whether the devices are stand-alone base station devices 703, beacon devices 1501, or comprise the GPS based service. The service offerings of the standalone base station devices 703, the beacon devices 1501, or the GPS based service are then determined 204. The service offerings include business information and advertisements configured by the vendors using the business information configuration tool 703c illustrated in FIGS. 14A-14D. Solicitation filters may be provided on the client application 702 to enable the mobile device user 701 to select the service offerings of choice. The solicitation filters are configured by the mobile device user 701 based on preferences of the user 701. The solicitation filters enable the non-spamming dissemination of information and advertisements to the mobile device by allowing the information and advertisements to be sent to the mobile device user 701 based on the preferences of the mobile device user 701. If the solicitation filters are enabled 205 on the client application 702, the client application 702 determines whether the service offerings meet 206 the filter criteria configured by the mobile device user 701. If the service offerings meet the filter criteria, the base station sensor devices 2302 or the GPS based service are added 207 to the area list. If solicitation filters are not enabled on the client application 702, the base station sensor devices 2302 or the GPS based service are directly added 207 to the area list. The solicitation filters may be enabled or disabled on the GUI 702a as illustrated in FIG. 21B. The mobile device user 701 may also add solicitation filters and list the solicitation filters as illustrated in FIG. 21B.

The client application 702 then connects with the base station sensor devices 2302 or GPS based service and solicits additional information and capabilities from each of the base station sensor devices 2302 or the GPS based service on the area list. The client application 702 may also store additional information for each of the base station sensor devices 2302 or the GPS based service offerings in the area list. The high level information of the service offerings of the base station sensor devices 2302, or GPS based service is categorized and displayed 208 on the GUI 702a of the client application 702. The mobile device user 701 may select a particular base station device or GPS based service and request more information. The client application 702 then connects with the base station sensor devices 2302 and the GPS based service and fetches additional information requested by the mobile device user 701. The additional information may be text files, pictures, audio files, video files, etc.

Figure 22A:
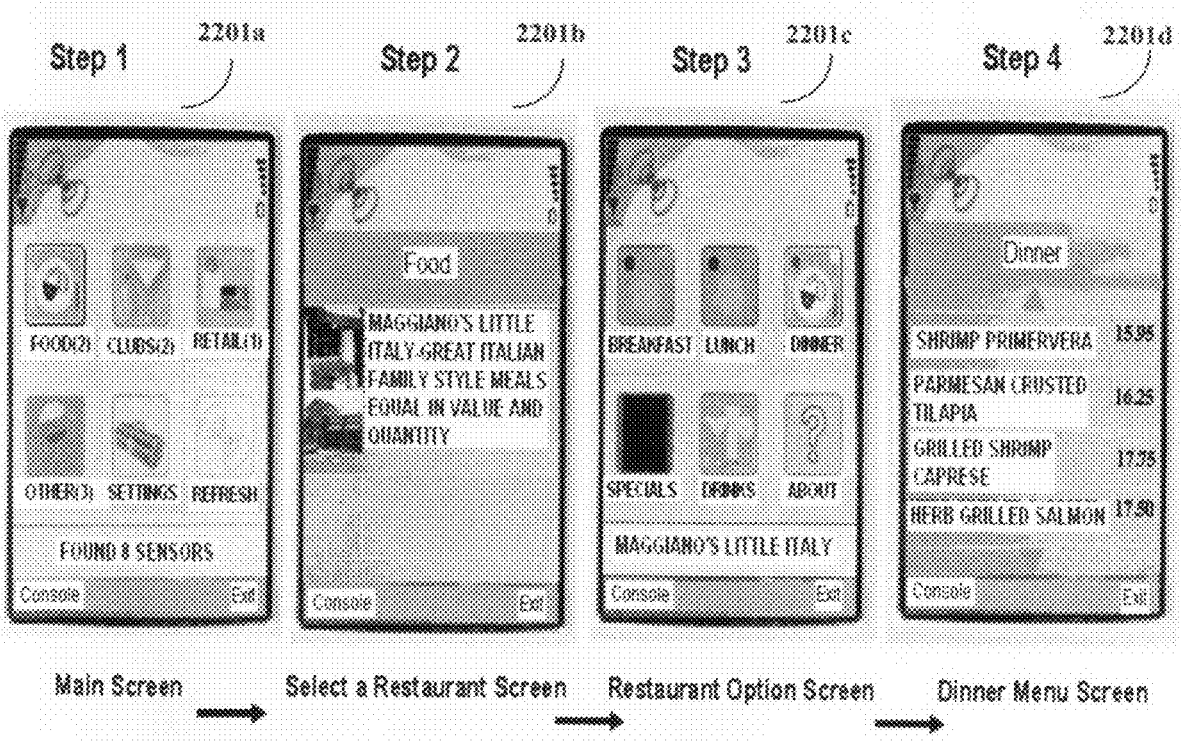
FIGS. 22A-22B exemplarily illustrate the mobile device user's interactions on the graphical user interface of the client application when the environment and proximity aware information and advertisements are being received.
Figure 22B:
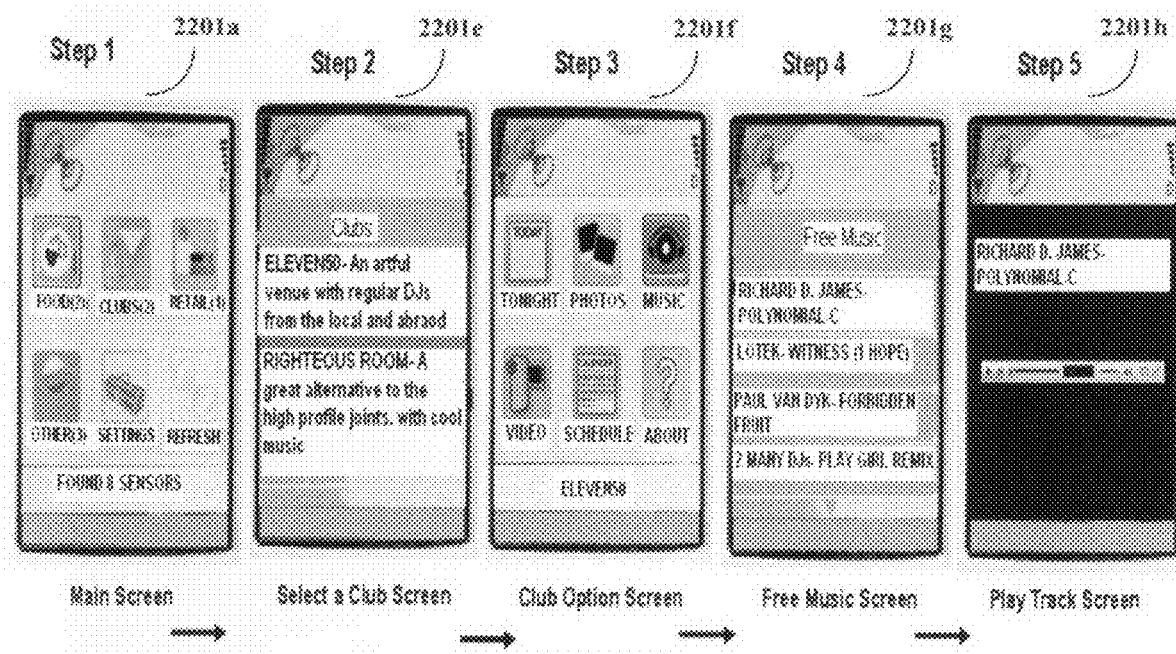

The active pull mode may be understood by the examples illustrated in FIGS. 22A-22B. FIG. 22A illustrates the GUI 702a of the client application 702 when a mobile device user 701 interacts with the base station sensor device to obtain a menu from a selected restaurant. The mobile device user 701 starts the client application 702 on the mobile device. The client application 702 displays the "Solicitations/Sensors/Services in Area" screen 2201a. This screen 2201a displays a list of the solicitations categorized in higher level categories such as food, clubs, retail, etc., in the area. If the solicitation filters are enabled on the client application 702, the list will only contain the solicitations meeting the filter criteria. If the solicitation filters are disabled, the list will contain all solicitations or services available in the area. The mobile device user 701 may navigate the list using navigations buttons provided on the GUI 702a.

As illustrated in FIG. 22A, when the mobile device user 701 selects the food option on the "Solicitations/Sensors/Services in Area" screen 2201a, a list of restaurants in the area is displayed to the mobile device user 701 on the restaurant select screen 2201b. The mobile device user 701 may navigate the list and on selecting a restaurant, the restaurant options such as breakfast, lunch, dinner, specials, drinks, etc., are displayed to the mobile device user 701 on the restaurant option screen 2201c. On selecting a restaurant option, for example, the dinner option, the dinner menu of the restaurant is displayed to the mobile device user 701 on the dinner menu screen 2201d. In another example illustrated in FIG. 22B, when the mobile device user 701 selects the clubs option on the "Solicitations/Sensors/Services in Area" screen 2201a, a list of clubs in the area is displayed to the mobile device user 701 on the club select screen 2201e. The mobile device user 701 may navigate the list and on selecting a club, the club options such as music, videos, schedules, etc., are displayed to the mobile device user 701 on the club option screen 2201f. On selecting a club option, for example, the music option, a list of music tracks of various artists is displayed to the mobile device user 701 on the free music screen 2201g. On selecting a particular music track, the mobile device user 701 may listen to music track as the track plays on the play track screen 2201h.

The mobile device user 701 may also navigate other sections of the client application 702 by selecting the application menu via the console button provided on the GUI 702a illustrated in FIG. 22A. From the application menu, the mobile device user 701 may view solicitations or sensors 804 or services in the area, view saved solicitations, and configure solicitation filters. The mobile device user 701 may also save the business information and advertisements for later use on the mobile device. The mobile device user 701 may then share the saved business information and advertisements with other mobile device users. The saved solicitations screen is illustrated in FIG. 21A. The mobile device user 701 may select a saved solicitation to display on the GUI 702a. The solicitation configuration screen is illustrated in FIG. 21B. The mobile device user 701 may enable the solicitation filters, add solicitation filters, list the solicitation filters, and enable notification using the solicitation configuration screen. The mobile device user 701 may also use the number pad to select menu options.

The transfer of service offerings information of the vendors may also be initiated automatically by the client application 702 in a passive pull mode of operation without user intervention. In the passive pull mode of operation, the client application 702 is running in the background and solicitation messages are sent to the client application 702. In the case of the stand-alone base station devices 703, the solicitation messages are sent from the standalone base station devices 703. In the case of the beacon devices 1501 and the GPS based service, the solicitation messages are sent from the data server 1502. The solicitation messages are filtered based on filter criteria configured on the client application 702. The client application 702 notifies the mobile device user 701 of the availability of the filtered solicitation messages, thereby enabling the mobile device user 701 to request for additional information from the base station sensor devices 2302.

In the passive pull mode, the mobile device user 701 is unaware of the base station sensor devices 2302. The base station sensor devices 2302 solicit the client application 702 of the mobile device. In the passive pull mode, the client application 702 acts as an agent on behalf of the mobile device user 701 and filters the incoming solicitations based on the filter criteria previously set by the mobile device user 701. In the case of the standalone base station devices 703, when the mobile device user 701 approaches the standalone base station devices 703, the stand-alone base station devices 703 detect the presence of the mobile device user 701 using the proximity and motion sensors 703a. The stand-alone base station devices 703 then send solicitation messages to the mobile device via the Bluetooth wireless protocol, Wi-Fi protocol, or WiMAX technology. The mobile device may be set to vibrate or beep if a particular item of interest to the user 701 is found in a nearby area. For example, if there is a sale at a shop in the vicinity of the mobile device user 701, the mobile device may vibrate or beep in order to notify the mobile device user 701 of the sale.

The client application 702 on the mobile device then processes the solicitation messages and determines whether the standalone base station devices 703 offer services of interest to the mobile device user 701. The service offerings comprise the business information and advertisements configured by the vendor. The client application 702 then accepts or denies the solicitations from the standalone base station devices 703. If client application 702 is not available on the mobile device or the solicitation times out, the stand-alone base station devices 703 may request the mobile device user 701 to download the client application 702, if the mobile device is configured for downloading of the client application 702. The standalone base station devices 703 may also entertain requests from the mobile device user 701 to download the client application 702.

If the mobile device user 701 is interested in the service offerings of the standalone base station devices 703, the client application 702 retrieves a preliminary summary of the business information and advertisements from the stand-alone base station devices 703, and notifies the mobile device user 701 of the availability of the business information and advertisements. The mobile device user 701 may then have the option to ignore, deny, or investigate the provided information and advertisements. The investigation entails downloading a series of media files such as video files, audio files, image files, etc. from the stand-alone base station devices 703, or looking up a uniform resource locator (URL) on the internet. The client application 702 may also send a request with the length and width of the screen size of the requesting mobile device to the standalone base station devices 703. Depending on the screen size of the mobile device, the standalone base station devices 703 disseminate the appropriate sized advertisements to the mobile device user 701. In the case of the beacon devices 1501 and the GPS based service, the business information and advertisements are stored on the data server 1502 and sent from the data server 1502 to the mobile device user 701.

Figure 3:
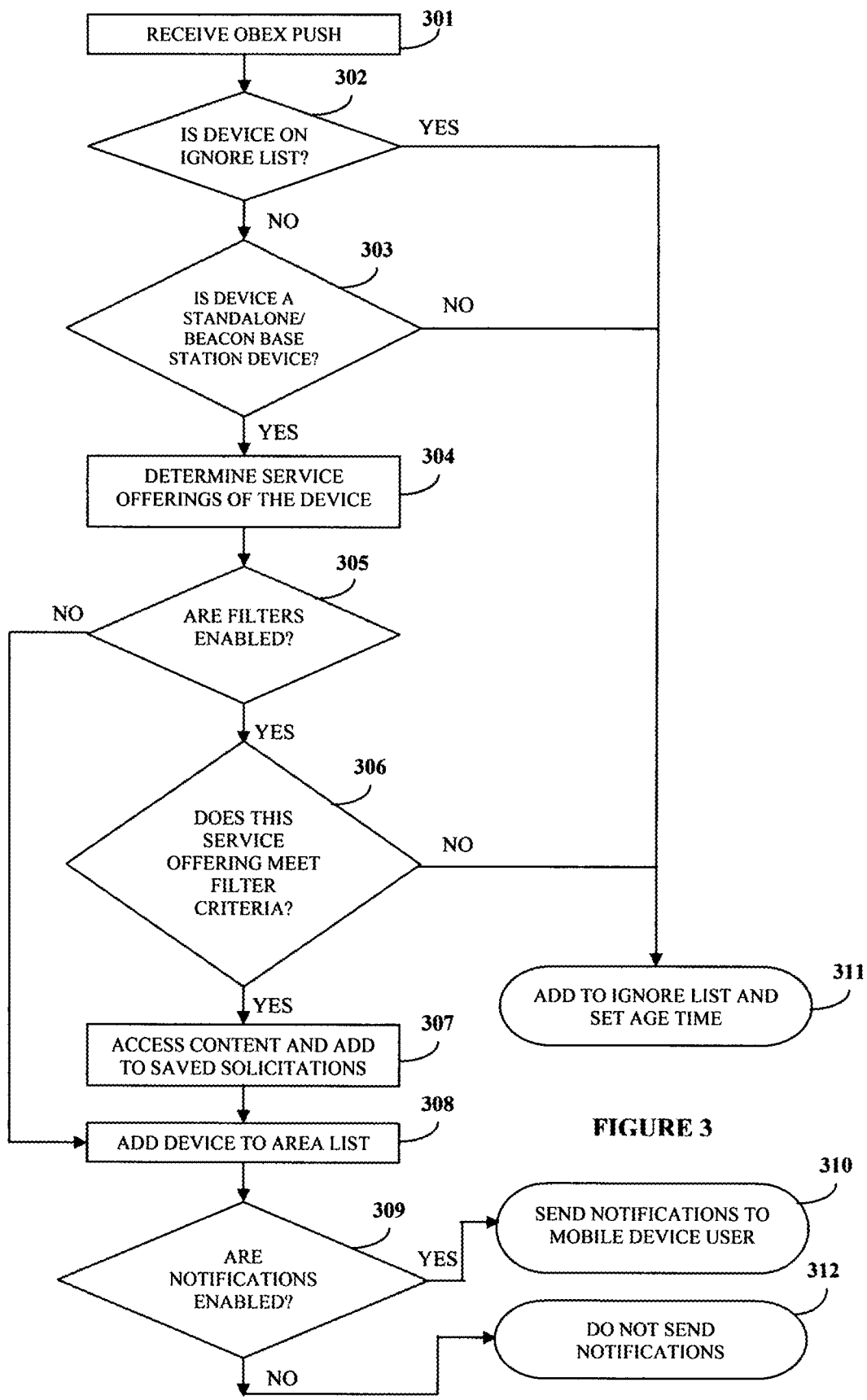
FIG. 3 illustrates a flow chart describing the steps of passive polling of the client application by the base station sensor devices.

FIG. 3 illustrates a flow chart describing the steps of passive polling of the client application 702 by the base station sensor devices 2302. The client application 702 receives 301 an object exchange (OBEX) push from the base station sensor devices 2302. OBEX is a communications protocol facilitating the exchange of binary objects between devices. The client application 702 then determines 302 whether the devices are on the ignore list. If the devices are not on the ignore list, the client application 702, then determines 303 whether the devices are standalone base station devices 703 or beacon devices 1501. If the devices are neither standalone base station devices 703 nor beacon devices 1501, the devices are added 311 to the ignore list and an age time is set 311 for the ignored devices by the client application 702. The age time is used to keep the non-base station sensor devices in the ignore list for a predetermined period of time. For example, if the age time is set to one month, the non-base station sensor devices will remain in the ignore list for a pre-set period of time, for example, one month.

If the devices are stand-alone base station devices 703 or beacon devices 1501, the service offerings are determined 304. The service offerings comprise the business information and advertisements stored on the stand-alone base station devices 703 or the data server 1502. If solicitation filters are enabled 305 on the mobile device and if the service offerings meet 306 the filter criteria set by the mobile device user 701, the mobile device user 701 may access 307 the content comprising the business information and advertisements and add 307 the content to the saved solicitations on the mobile device. The saved solicitation screen is illustrated in FIG. 21A. The stand-alone base station devices 703 or beacon devices 1501 are also added 308 to the area list of the client application 702. If notifications are enabled 309 on the mobile device, notifications are sent 310 to the mobile device user 701 from the stand-alone base station devices 703 or the data server 1502. The notifications may be enabled using the solicitation filters screen illustrated in FIG. 21B. If notifications are not enabled on the mobile device, notifications are not sent 312 to the mobile device user.

The pull mode of operation may be exemplarily illustrated by considering the Wi-Fi scenario of the method disclosed herein. Consider an example of a mobile device capable of Wi-Fi connectivity, a Wi-Fi aware client application 702 and stand-alone base station devices 703 supporting the Wi-Fi protocol. In the pull mode of operation, there are two types of pull operations, namely an active pull and a passive pull. In the active pull mode, the mobile device user 701 starts the client application 702 on the mobile device. The client application 702 discovers all the available SSIDs and MAC addresses in the wireless range to detect the presence of active standalone Wi-Fi base station devices. The client application 702 weeds out the non base station sensor devices from a plurality of devices with Wi-Fi capabilities. The service offerings of the stand-alone base station devices 703 are categorized and displayed on the GUI 702a as illustrated in FIGS. 22A-22B. When the mobile device user 701 selects a certain category on the client application 702, the client application 702 interacts with each of the stand-alone base station devices 703 in the wireless range using hypertext transfer protocol (HTTP) and receives the requested information and advertisements from the stand-alone base station devices 703. The requested information and advertisements are then disseminated to the mobile device user 701 from the standalone base station devices 703 and displayed on the GUI 702a as illustrated in FIGS. 22A-22B. In the passive pull mode, the client application 702 periodically polls the status of available Wi-Fi networks in the background to detect the presence of the active stand-alone base station devices 703.

Consider another example of a mobile device capable of Wi-Fi connectivity, a Wi-Fi aware client application 702, and beacon devices 1501 supporting the Wi-Fi protocol. In the active pull mode, the mobile device user 701 starts the client application 702 on the mobile device. The client application 702 discovers all the available SSIDs and MAC addresses in the wireless range to detect the presence of active Wi-Fi beacon devices. The client application 702 weeds out the non-base station sensor devices from a plurality of devices with Wi-Fi capabilities. The client application 702 transfers the list of SSIDs and MAC address information of the selected beacon devices 1501 to the data server 1502 using the wireless internet service based on GSM or CDMA technology. After receiving the list of SSIDs and MAC addresses, the data server 1502 identifies the service offerings of the vendors in the vicinity of the identified beacon devices 1501. The service offerings of the vendor are then transferred to the client application 702 from the data server 1502 via the GSM or CDMA based wireless internet service. The service offerings are categorized and displayed on the GUI 702a as illustrated in FIGS. 22A-22B.

When the mobile device user 701 selects a certain category, the client application 702 interacts with the data server 1502 over GSM or CDMA based wireless internet service using HTTP or XML and receives the requested information and advertisement stored on the data server 1502. The requested information and advertisements are then disseminated to the mobile device user 701 from the data server 1502 and displayed on the GUI 702a as illustrated in FIGS. 22A-22B. In the passive pull mode, the client application 702 periodically polls the status of the available Wi-Fi networks in the background and sends the list of SSIDs and MAC address information to the data server 1502 using GSM or CDMA based wireless internet service.

Consider an example of the active pull mode operation of the client application 702 on a mobile device with GPS capabilities. When the mobile device user 701 starts the client application 702, the client application 702 sends the GPS coordinates of the mobile device to the data server 1502. The data server 1502 performs reverse geocoding of the GPS coordinates of the mobile device and determines the actual location of the mobile device user 701. The data server 1502 also performs a first level approximation to determine the zip code of the location of the mobile device user 701 by matching the location of the mobile device user against a list of zip codes. Consider a case where there are 300 businesses having the same zip code as the zip code of the location of the mobile device user 701. The data server 1502 calculates the distance between each of these 300 businesses from the location of the mobile device user 701. Based on the proximity of the mobile device user 701 to the each of the businesses, the data server 1502 sorts the vendors closest to the location of the mobile devices user 701 and renders the service offerings to the client application 702. The service offerings are categorized and displayed on the GUI 702a as illustrated in FIGS. 22A-22B. The categories may comprise restaurant categories, night-club categories, retail categories, etc.

When the mobile device user 701 selects a certain category, the client application 702 interacts with the data server 1502 over GSM or CDMA based wireless internet service using HTTP or XML and receives the requested information and advertisement stored on the data server 1502. The requested information and advertisements are then disseminated to the mobile device user 701 from the base station sensor device and displayed on the GUI 702a as illustrated in FIGS. 22A-22B.

Figure 4:
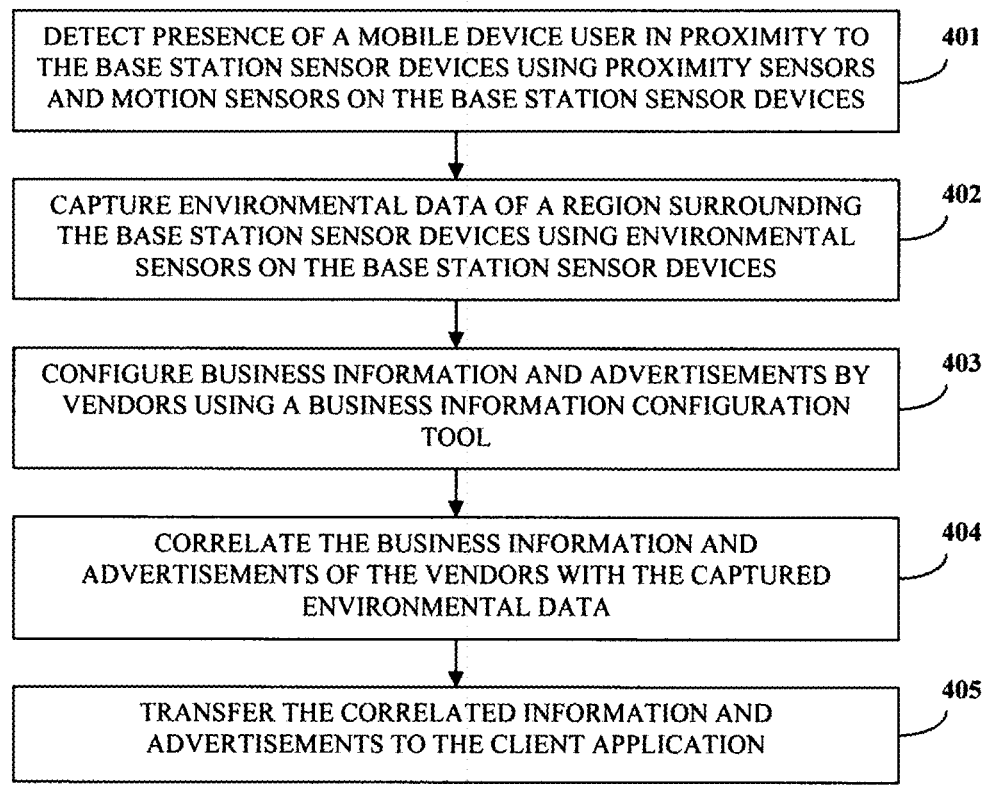
FIG. 4 illustrates a method of disseminating environment and proximity aware information and advertisements to a mobile device user in a push mode of operation.

The dissemination of environment and proximity aware information and advertisements to the mobile device user 701 may also be performed in a push mode of operation as illustrated in FIG. 4. In the push mode, proximity sensors and motion sensors on the base station sensor devices 2302 detect 401 the presence of the mobile device user 701 in proximity to the base station sensor devices 2302. Environmental sensors 703b on the base station sensor devices 2302 capture 402 environmental data of a region surrounding the base station sensor devices 2302. In the case of the beacon devices 1501, the client application 702 transfers the encoded sensor information comprising the environmental data to the data server 1502.

Vendors configure 403 business information and advertisements using the business information configuration tool 703c illustrated in FIGS. 14A-14D. Business information and advertisements are configured on the standalone base station devices 703 by the vendors and on the data server 1502 for the beacon devices 1501 and the GPS based service. The configured information and advertisements are correlated 404 with the captured environmental data and the local time data and transferred 405 to the client application 702. The transfer of the correlated information and advertisements to the mobile device is performed using a Bluetooth object push profile for Bluetooth compatible devices and a HTTP protocol for Wi-Fi based devices. In the push mode of operation, the client application 702 is disabled on the mobile device and is not available to the mobile device user 701. The mobile device user 701 announces the mobile device availability and the correlated information and advertisements are transferred to the mobile device from the stand-alone base station devices 703. In the case of beacon devices 1501 and the GPS based service, the correlated information and advertisements are transferred to the mobile device from the data server 1502.

Figure 5:
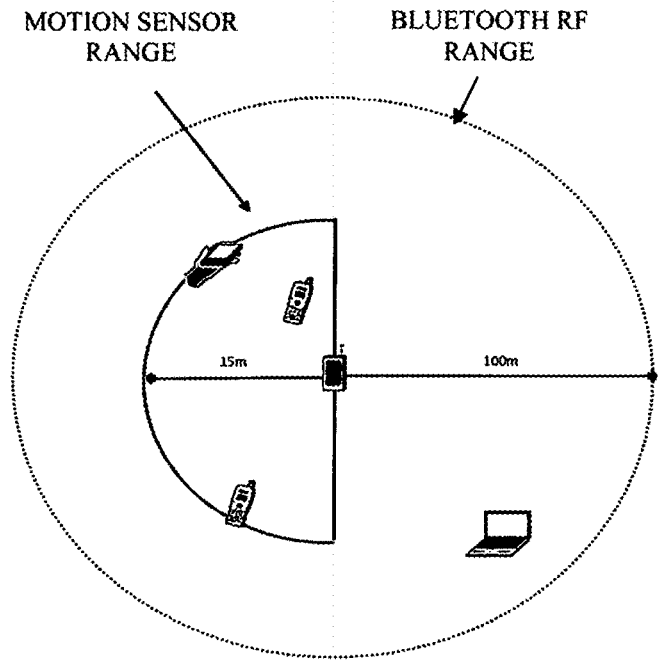
FIG. 5 exemplarily illustrates the Bluetooth radio frequency range and coverage area of a motion sensor.

Consider the case of the standalone base station devices 703 in the push mode of operation. The stand-alone base station devices 703 in the push mode perform service discovery of Bluetooth, Wi-Fi, or WiMAX capable mobile devices via the Bluetooth wireless protocol, Wi-Fi protocol, and WiMAX technology respectively. When motion sensors are present on the stand-alone base station devices 703, the identification process is triggered when the mobile device user 701 walks within the motion sensor area of detection as illustrated in FIG. 5. When motion sensors are not present on the stand-alone base station devices 703, the identification process occurs periodically with a predetermined interval. If the mobile device of the user 701 has been identified by the standalone base station devices 703, the standalone base station devices 703 perform an object push of the correlated information and advertisements to the mobile device based on criteria configured on the standalone base station devices 703. For example, the stand-alone base station devices 703 may be configured to push the correlated information and advertisements to a mobile device of the user 701 who has not received content within a certain preset period of time, for example in the past 30 minutes, or been among the most recent number of users, for example the last 1000 users to receive content. The stand-alone base station devices 703 may also be configured to push additional content to the mobile device user 701 who has remained in the vicinity of the base station sensor device for a configured period of time.

The administrator may also configure the stand-alone base station devices 703 or the data server 1502 for the beacon devices 1501 to customize the correlated information and advertisements based on the environmental data captured by the environmental sensors 703b. For example, temperature sensors on the base station sensor devices 2302 detect the temperature of the region surrounding the respective base station sensor devices 2302 and frappuccino advertisements for hot weather and café latte advertisements for cold weather may be pushed to the mobile device. The light sensors and time sensors on the base station sensor devices 2302 determine the time of day and lunch menu advertisements during lunch time and dinner menu advertisements during dinner time may be pushed to the mobile device. Moreover, the base station sensor devices 2302 comprise an internal real time clock 1102 allowing the content pushed to the mobile device to be timed to coincide with a particular event such as lunch, dinner, happy hour, etc., based on the time and the day of the week. In another example, humidity sensors on the base station sensor devices 2302 determine the chance of rain in the region surrounding the base station sensor devices 2302 and rain coat advertisements may be sent to the mobile device. The base station sensor devices 2302 may also collect statistics on the number of mobile device users receiving content, the time and under what conditions the mobile device users received the content. Furthermore, the base station sensor devices 2302 may solicit business cards from the mobile device users to add the mobile device users to contact lists, raffles, call backs, etc.

Figure 6:
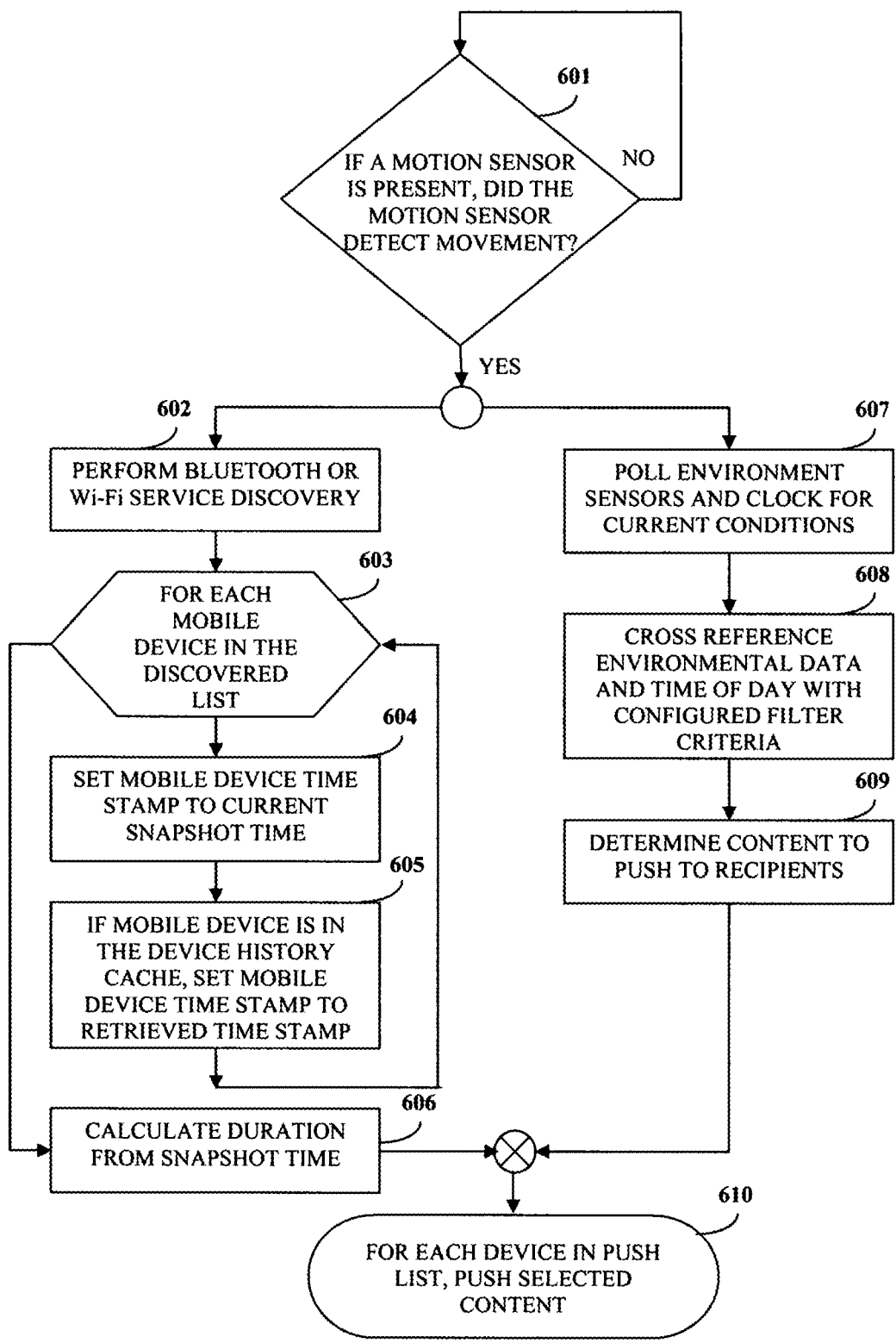
FIG. 6 illustrates a flow chart describing the dissemination of environment and proximity aware information and advertisements to a mobile device user in a push mode of operation.

FIG. 6 illustrates a flow chart describing the dissemination of environment and proximity aware information and advertisements to a mobile device user 701 in a push mode of operation. If motion sensors are present 601 on the base station sensor devices 2302, the base station sensor devices 2302 detect movement of the mobile device user 701. If the mobile device user 701 walks within the motion sensor area of detection as illustrated in FIG. 5, the base station sensor devices 2302 perform 602 service discovery of Bluetooth, Wi-Fi, or WiMAX capable mobile devices via the Bluetooth wireless protocol, Wi-Fi protocol, and WiMAX technology respectively. For each of the mobile devices in the discovered list 603, the base station sensor devices 2302 sets 604 the time stamp of the Bluetooth, Wi-Fi, or WiMAX capable mobile devices to the current snapshot time. If the Bluetooth, Wi-Fi, or WiMAX capable mobile devices are in the device history cache, the time stamp of the Bluetooth or Wi-Fi mobile device is set 605 to the retrieved time stamp. For each of the Bluetooth, Wi-Fi, or WiMAX capable mobile devices in the list, the duration from the snapshot time is calculated 606. Subsequently, the environmental data is polled 607 from the environmental sensors 703b and time of day is determined from the internal clock 1102. The environmental data and time of day is cross referenced 608 with the configured criteria. The content comprising the correlated information and advertisements is determined 609 and pushed 610 to the mobile device of the user 701.

If the client application 702 is not available on the mobile device, the base station sensor devices 2302 may act as firewalls. The base station sensor devices 2302 intercept any HTTP traffic from web browsers, or non-sensor aware mobile device applications. The base station sensor devices 2302 may perform an HTTP redirect to a web page comprising the correlated information and advertisements to be pushed to the mobile device. In this case, the mobile device user 701 must actively search for the base station sensor Wi-Fi network and connect to the network 704 in order to receive the environment and proximity aware information and advertisements being provided by the base station sensor devices 2302.

The mobile device user 701 may also interact with the base station sensor devices 2302, or the GPS based service using the mailbox mode of operation. In the mailbox mode, the mobile device user 701 may send an internet message using Bluetooth, Wi-Fi, and WiMAX from the mobile device to the stand-alone base station devices 703. The internet message comprising contact information, phone number, and feedback of the mobile device user 701 is stored on the stand-alone base station devices 703 for retrieval by the vendors at a future point in time. The mobile device user 701 may also send the internet message using the wireless internet service based on GSM technology and CDMA technology to the data server 1502. In the case of beacon devices 1501 and the GPS based service, the internet message is stored on the data server 1502 for retrieval by the vendors at a future point in time.

The mailbox mode of operation enables the base station sensor devices 2302 to gather contact information, phone numbers, and feedback from the mobile device user 701. The mailbox mode may be used to receive contact information such as electronic business cards for contact lists, raffles, call backs, etc. If a short message is included, the mobile device user 701 may provide feedback to the administrators of the base station sensor devices 2302 or the data server 1502. In the mailbox mode, the mobile device user 701 may also send messages containing bids for auctions, indicate preferences in exchange for coupons in surveys, and purchase items using a cash register.

Figure 7:
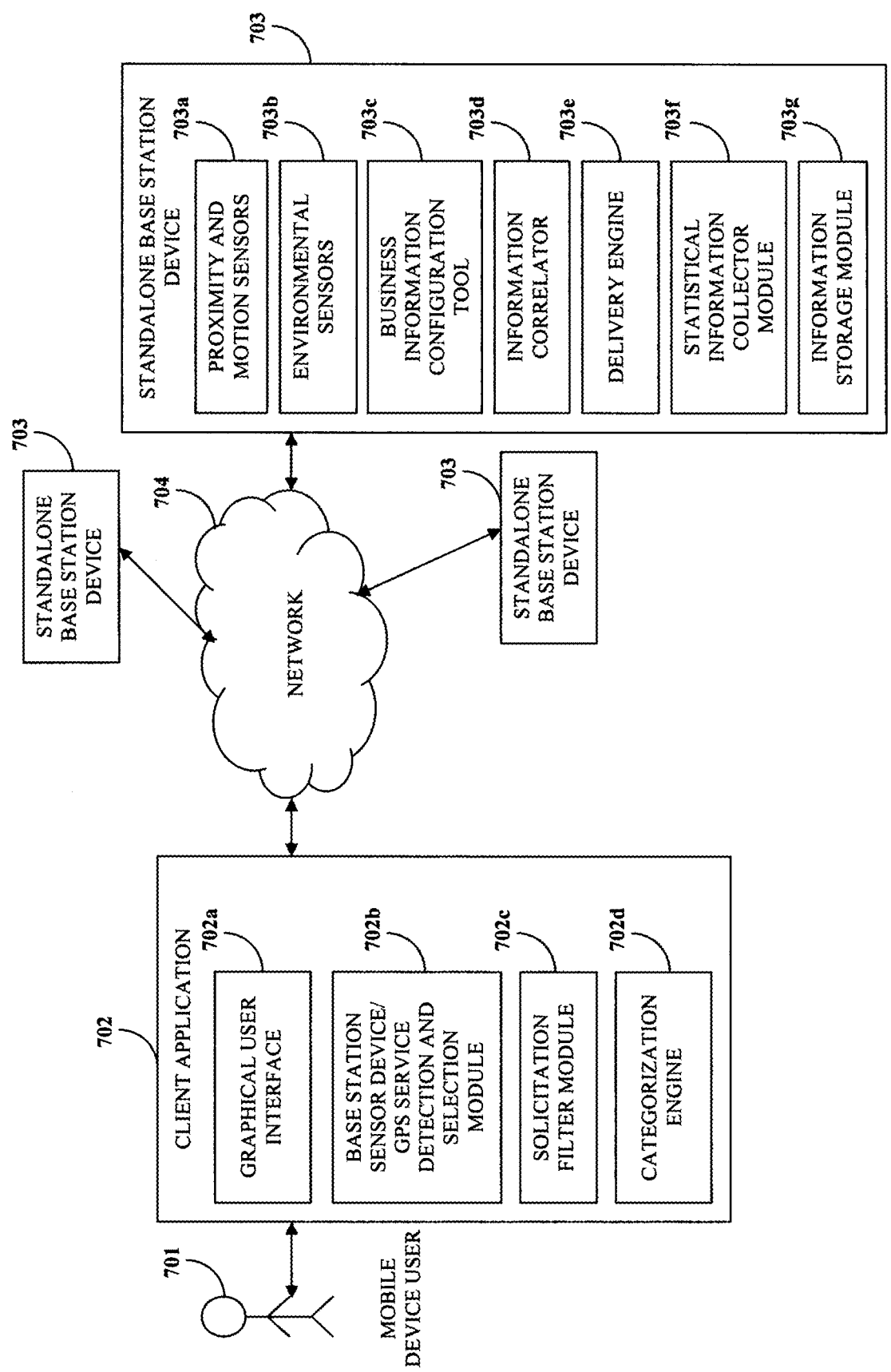
FIG. 7 illustrates a system for disseminating environment and proximity aware information and advertisements to a mobile device user from a plurality of standalone base station devices.

FIG. 7 illustrates a system for disseminating environment and proximity aware information and advertisements to a mobile device user 701 from a plurality of stand-alone base station devices 703. The system disclosed herein comprises a client application 702 on the mobile device and the stand-alone base station devices 703. The mobile device may be one of a mobile phone, a personal digital assistant, a laptop, a palmtop, and any hand-held computing device. The client application 702 detects the presence of the stand-alone base station devices 703 in proximity to the mobile device. The client application 702 detects the presence of the stand-alone base station devices 703 using one of a Bluetooth wireless protocol, a Wi-Fi protocol, and WiMAX technology. The client application 702 comprises a graphical user interface (GUI) 702a, a base station sensor device/GPS service detection and selection module 702b, a solicitation filter module 702c, and a categorization engine 702d. The client application 702 displays the environment and proximity aware information and advertisements to the mobile device user 701 on the GUI 702a. The GUI 702a may also be used by the mobile device user 701 to request for information from the vendors. For example, the mobile device user 701 may request for information such as movie trailers, movie reviews, and movie listings from a movie cinema using the GUI 702a of the client application 702.

The base station sensor device/GPS service detection and selection module 702b detects and selects the stand-alone base station devices 703 with Bluetooth, Wi-Fi, and WiMAX capabilities. The base station sensor device/GPS service detection and selection module 702b further identifies and discards the non-base station sensor devices from a plurality of devices with Bluetooth, Wi-Fi, and WiMAX capabilities. The delivery engine 703e then transfers high level information of service offerings of the vendors to the client application 702 from the detected standalone base station devices 703 by one of a Bluetooth wireless protocol, a Wi-Fi protocol, and WiMAX technology. The solicitation filter module 702c filters the solicitation messages comprising the service offerings of the vendors in the client application 702 based on filter criteria. The filter criteria is set by the mobile device user 701 based on the preferences of the mobile device user 701 using the solicitation filter module 702c. The categorization engine 702d then categorizes the filtered service offerings information of the vendors into multiple categories. The categories are listed and displayed on the GUI 702a of the client application 702.

The mobile device user 701 may select one or more of the categories displayed on the GUI 702a. The client application 702 then communicates with the stand-alone base station devices 703 to receive business information and advertisements of the vendors based on the selected categories. Each of the stand-alone base station devices 703 comprises proximity and motion sensors 703a, environmental sensors 703b, a business information configuration tool 703c, an information correlator 703d, a delivery engine 703e, a statistical information collector module 703f, and an information storage module 703g. The different views of the base station sensor device and the placement of the sensors 804 on the base station sensor device are illustrated in FIGS. 8A-8C. The base station sensor device is one of a stand-alone base station device 703 and a beacon device. FIG. 8A illustrates the front view 801a and the right side view 801b of the base station sensor device. FIG. 8A further illustrates the placement of the sensors 804, a power 803 socket, and a universal serial bus (USB) 802 receptacle. An antenna is placed internally in the base station sensor device. The base station sensor device may comprise an internal wireless radio antenna or an external antenna. FIG. 8B illustrates the back view 801c and the left side view 801d of the base station sensor device with a mount point 805. An optional Ethernet network interface (NI) 806 may also be present on the base station sensor device as illustrated in FIG. 8C. The Ethernet NI 806 may be utilized to perform remote device management via transmission control protocol (TCP), or internet protocol (IP) in installations of a local area network infrastructure.

The proximity and motion sensors 703a detect the presence and movement of the mobile device user 701 in proximity to the base station sensor devices 2302. The proximity sensors detect the presence of the mobile device user 701 in proximity to the base station sensor devices 2302. The proximity sensors emit an electromagnetic field or beam in the vicinity of the base station sensor devices 2302 and look for changes in the electromagnetic field. The motion sensors detect the movement of the mobile device user 701 in proximity to the base station sensor devices 2302. The motion sensors detect the movement of the mobile device user 701 by measuring speed or vector of the mobile device user 701 in the field of view. The environmental sensors 703b on the base station sensor devices 2302 capture environmental data of a region surrounding the base station sensor devices 2302. The environmental sensors 703b comprise temperature sensors, pressure sensors, humidity sensors, light sensors, an internal clock 1102, or a combination thereof. The internal clock 1102 is used to determine the local time. The temperature sensors, the pressure sensors, the humidity sensors, and the light sensors determine the environmental data comprising temperature, pressure, humidity, and brightness of the region surrounding the base station sensor device.

The business information configuration tool 703c is used by the vendors to configure the business information and advertisements on the stand-alone base station devices 703 as illustrated in FIGS. 14A-14D. The business information configuration tool 703c is a web based application software tool. The information correlator 703d correlates the business information and advertisements of the vendors with the captured environmental data and the local time data. The information correlator 703d performs the correlation based on time of day, time duration of presence of the mobile device user 701 in proximity to the base station sensor devices 2302, and environmental conditions including weather conditions and atmospheric pressure. The delivery engine 703e then transfers the correlated information and advertisements to the client application 702 from the stand-alone base station devices 703 by one of a Bluetooth wireless protocol, a Wi-Fi protocol, and WiMAX technology. The delivery engine 703e then transfers the correlated information and advertisements to the client application 702 based on the selected categories. The delivery engine 703e further delivers text files, image files, audio file, video files, WAP files, and HTML files to the mobile device user 701.

The statistical information collector collects statistical information comprising the number of users using the service offerings of the vendors, time of downloads of information and advertisements, the number of said downloads, the profiles of users interested in the service offerings of the vendors. The information storage module 703g stores the service offerings of the vendors, the business information and advertisements configured by the vendors, the environmental data, the local time data, the correlated information and advertisements, and the statistical information.

Figure 10:
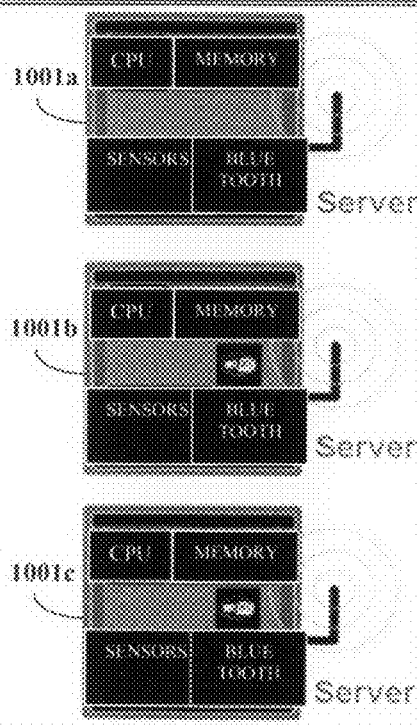
FIG. 10 illustrates the wireless and hardware options of the standalone base station device.
Figure 11:
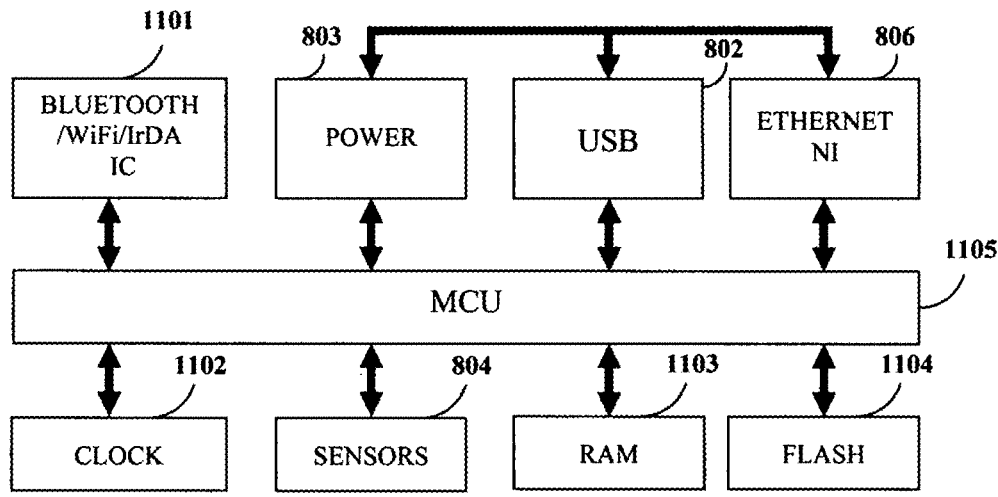
FIG. 11 illustrates the hardware components of the base station sensor devices.

The stand-alone base station devices 703 may be implemented with the wireless and hardware options illustrated in FIG. 10. As illustrated in FIG. 10, the standalone base station device 703 may be a Bluetooth® radio based device 1001a, a Wi-Fi radio based device 1001b, or a single wireless hardware device with both the Bluetooth® radio and the Wi-Fi radio 1001c. The standalone base station device 703 further comprises an on-board central processing unit (CPU), a memory, and sensors 804 running on data server software. FIG. 11 illustrates the hardware components of the base station sensor devices 2302. The internal hardware of each of the base station sensor devices 2302 comprises a microcontroller unit (MCU) 1105, a Bluetooth® or Wi-Fi or IrDA integrated circuit (IC) 1101, sensors 804, an internal or external antenna, a flash memory 1104, and a power 803 socket. The MCU 1105 interacts with a real time clock 1102 and a random access memory (RAM) 1103 in the base station sensor devices 2302. The USB 802 and the Ethernet NI 806 ports may also be provided on the base station sensor devices 2302. The power 803 socket distributes power to the hardware components of the base station sensor devices 2302. The base station sensor devices 2302 may be powered via a battery, power over the USB 802, power over the Ethernet, or an external power plug. A rechargeable battery with a solar cell may also be employed to power the base station sensor devices 2302. The battery may also be conserved by using a time clock feature. The time clock feature will turn off the device at a configured time slot, for example, at night.

Figure 12A:
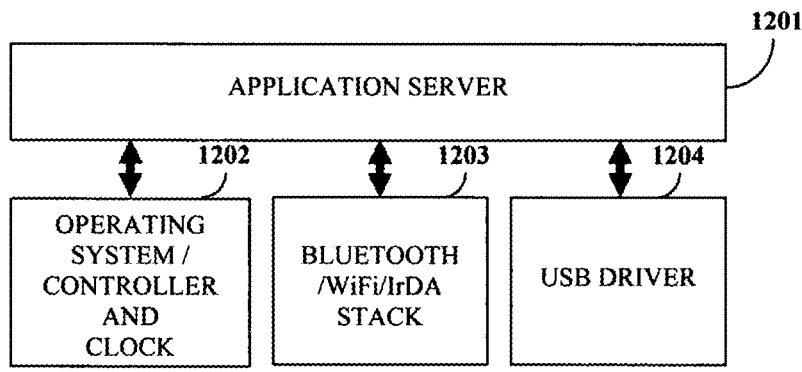
FIGS. 12A-12B illustrate the interaction between the hardware and software components of the stand-alone base station device and the application server.
Figure 12B:
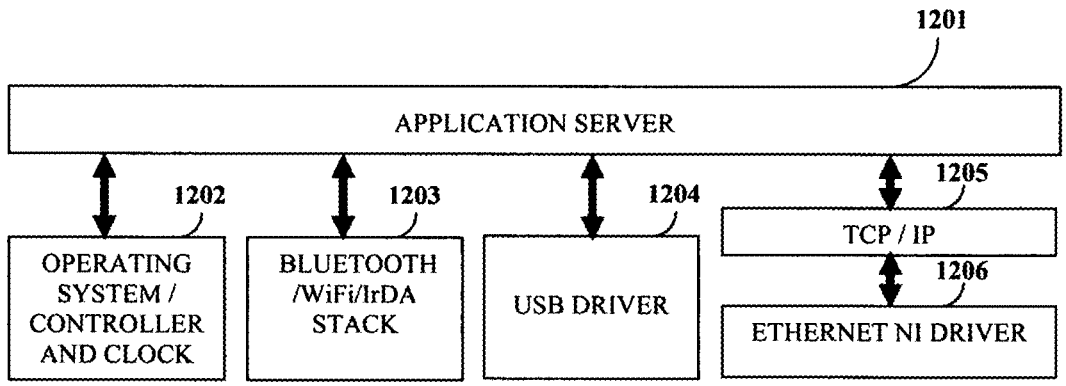

The interaction between the hardware and software components of the standalone base station device 703 and the application server 1201 is illustrated in FIGS. 12A-12B. The software components comprise an operating system (OS) 1202, a Bluetooth, Wi-Fi or IrDA software stack 1203, a USB driver 1204, an optional TCP/IP 1205 software stack and Ethernet NI driver 1206, and a clock controller. The software components may or may not support the Ethernet NI 806 as illustrated in FIG. 12B and FIG. 12A respectively. The software components utilize the embedded real-time operating system (RTOS) 1202 to interface with device drivers for the sensors 804 attached to the stand-alone base station device 703, the USB receptacle, the real time clock 1102, the flash memory 1104, the power management, and the Bluetooth base band radio. Moreover, a software Bluetooth, Wi-Fi, or IrDA stack 1203 and the application server 1201 deliver the content configured by an administrator.

Figure 13A:
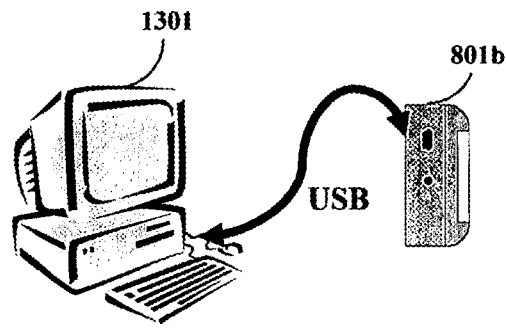
FIGS. 13A-13C illustrate the methods of configuring the base station sensor devices.
Figure 13B:
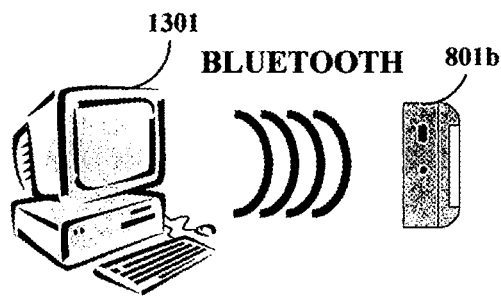
Figure 13C:
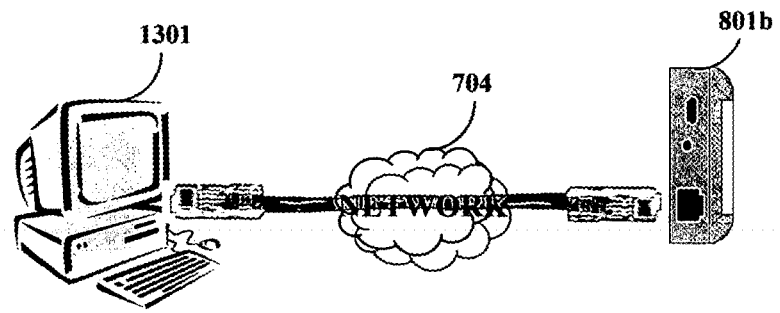
Figures 14A, 14B:
FIGS. 14A-14D exemplarily illustrate the business information configuration tool used to configure the business information and advertisements by the vendors.
Figure 14C:
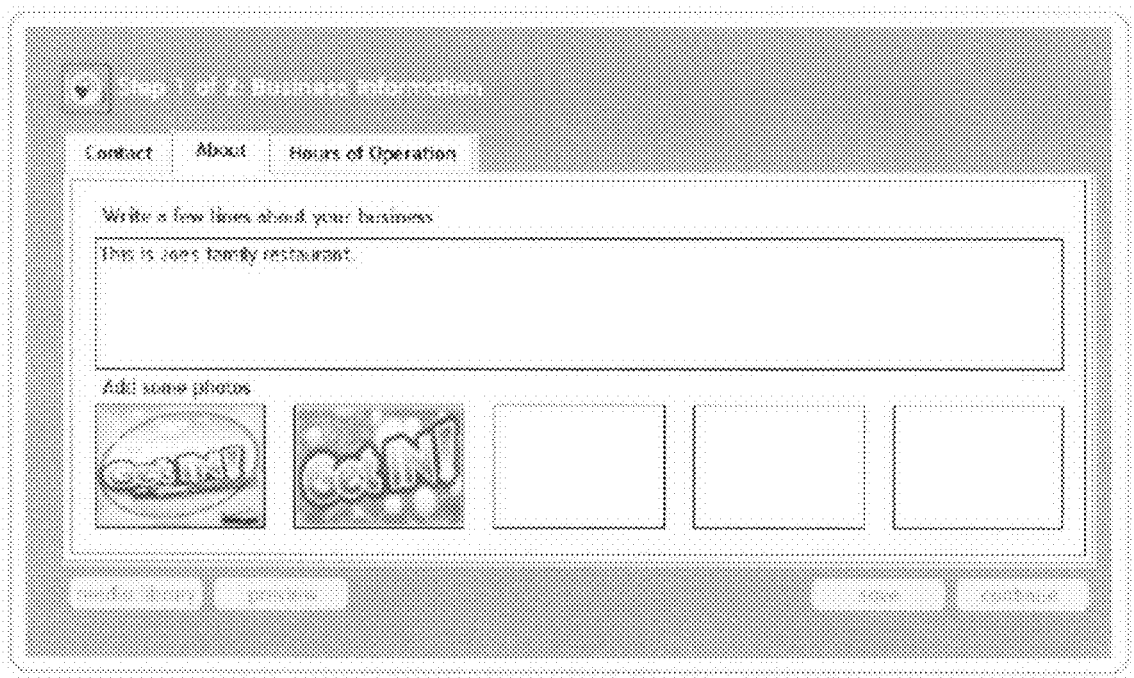
Figure 14D:
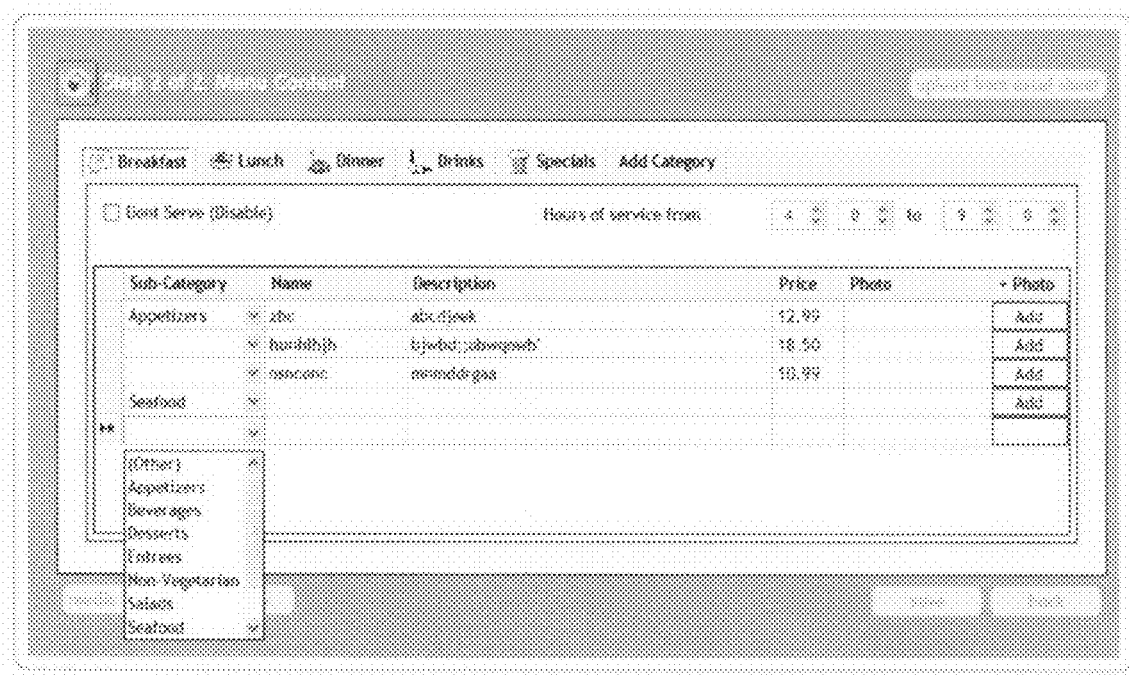

The administrator of each of the standalone base station devices 703 and each of the beacon devices 1501 configure the base station sensor devices 2302 from a personal computer (PC) 1301 via a USB 802, a Bluetooth® wireless connection, or remotely through an Ethernet port as illustrated in FIGS. 13A-13C. FIG. 13A illustrates a base station sensor device connected to the PC 1301 via a USB cable. FIG. 13B illustrates the base station sensor device connected to the PC 1301 via the Bluetooth serial port profile. If the base station sensor device supports the Ethernet NI 806, the administrator may configure the base station sensor device remotely via a TCP or IP connection. FIG. 13C illustrates the base station sensor device connected to the PC 1301 via the network 704 through the registered jack (RJ)-45 Ethernet port for remote configuration by the administrator. The initial configuration of the base station sensor device must be performed via the USB cable illustrated in FIG. 13A or via the Bluetooth wireless connection illustrated in FIG. 13B.

When the administrator configures the base station sensor device via the USB cable, the base station sensor device may be characterized as a remote USB memory storage device. The memory storage device stores configuration files describing the administrative behavior of the base station sensor device. The memory storage device further stores configuration files describing the criteria for the delivery and reception of digital media, the business information, and the advertisements. The base station sensor device may also be configured by directly writing data on the flash memory 1104.

The administrator may configure the base station sensor device manually as a storage device, or via an administrative personal computer (PC) client. The administrative PC client or a website based portal may be used to configure the base station sensor device. Through the administrative PC client, the administrator may upgrade firmware on the base station sensor device, configure the usage of the base station sensor device, and add or remove content from the base station sensor device. The configuration of the base station sensor device may include a description of the type of information being provided or collected and a media file to administer the information. The media file may be an audio file, a video file, an image file, a wireless application protocol (WAP) file, and a hypertext markup language (HTML) file. The media information is stored on the flash memory 1104 of the base station sensor device. In the case of the base station sensor device being connected to a local area network (LAN), the option of local storage is limited as the base station sensor device may act as a gateway to the data server 1502.

The administrator may also present content to the mobile device user 701. For example, the administrator may distribute a flyer to the mobile device of the user 701. The flyer may be wireless markup language (WML) file similar to an HTML file along with images, an image file, or an extensible markup language (XML) file rendered by the client application 702. The client application 702 renders these files for accurate display on the GUI 702a of the mobile device by taking into account screen size, device type, and capabilities supported on the mobile device. The administrator may also configure a unique number generator to generate a series of numbers as unique coupon codes to be inserted into the flyer. These unique numbers are one time use numbers. These numbers may also be used as identifiers for uniquely identifying from which base station sensor device the flyer was acquired.

The flyer may also include uniform resource locators (URLs). The mobile device user 701 uses the URLs to access additional information on a product via the HTTP or WAP protocols. The flyer may also include a redirection similar to the HTML ability. The flyer redirects the mobile device to a WAP service or a HTTP service. Moreover, the flyer may include the phone number used by the mobile device user 701 to call the administrator by a click or touch of a button on the mobile device. In case the base station sensor device has minimal or no flash memory 1104, the administrator may configure the base station sensor device to provide WAP based URLs in Bluetooth messages.

The administrator configures the base station sensor device using a Load-n-Forget option, an automatic field update option, and a manual update option. In the Load-n-Forget option, the administrator loads the information on the base station sensor device via the USB 802 or Bluetooth wireless connection. After the information is delivered to the mobile device user 701, the information is erased from the based station sensor device. The automatic field update option enables the administrator to update fields of information, gather statistics from the mobile device user 701 via the USB 802, Bluetooth wireless connection, or the Ethernet LAN. The manual update option allows the administrator to manually update information via the Bluetooth wireless connection or the USB 802. The administrator may configure the base station sensor device to advertise a collection of advertisements based on a set of criteria including the time of day, temperature, humidity, weather conditions, atmospheric pressure, or length of time the mobile device user 701 is in vicinity of the base station sensor device.

Figure 15:
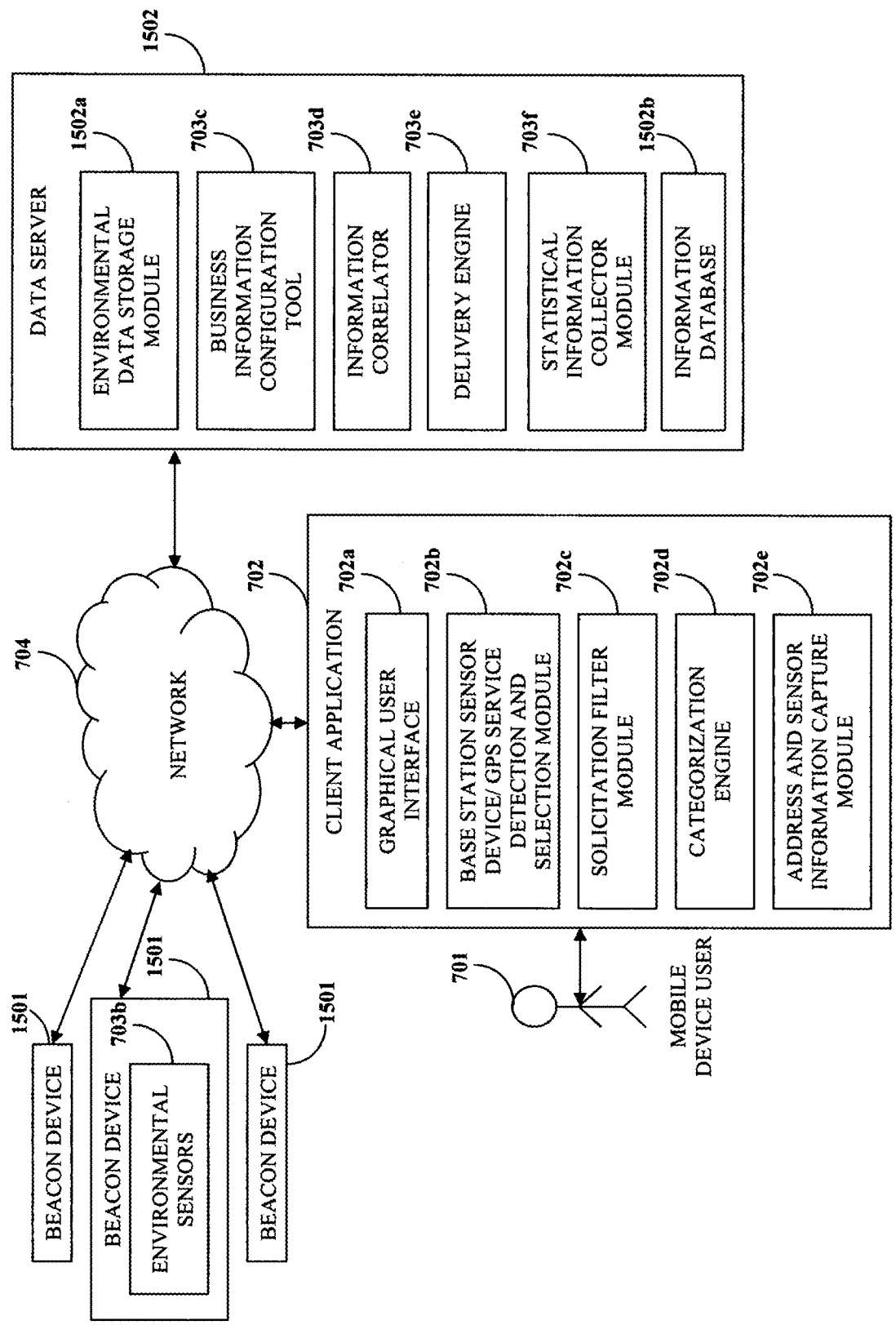
FIG. 15 illustrates the system for disseminating environment and proximity aware information and advertisements to a mobile device user from a data server on detection of beacon devices by the client application.
Figure 16:
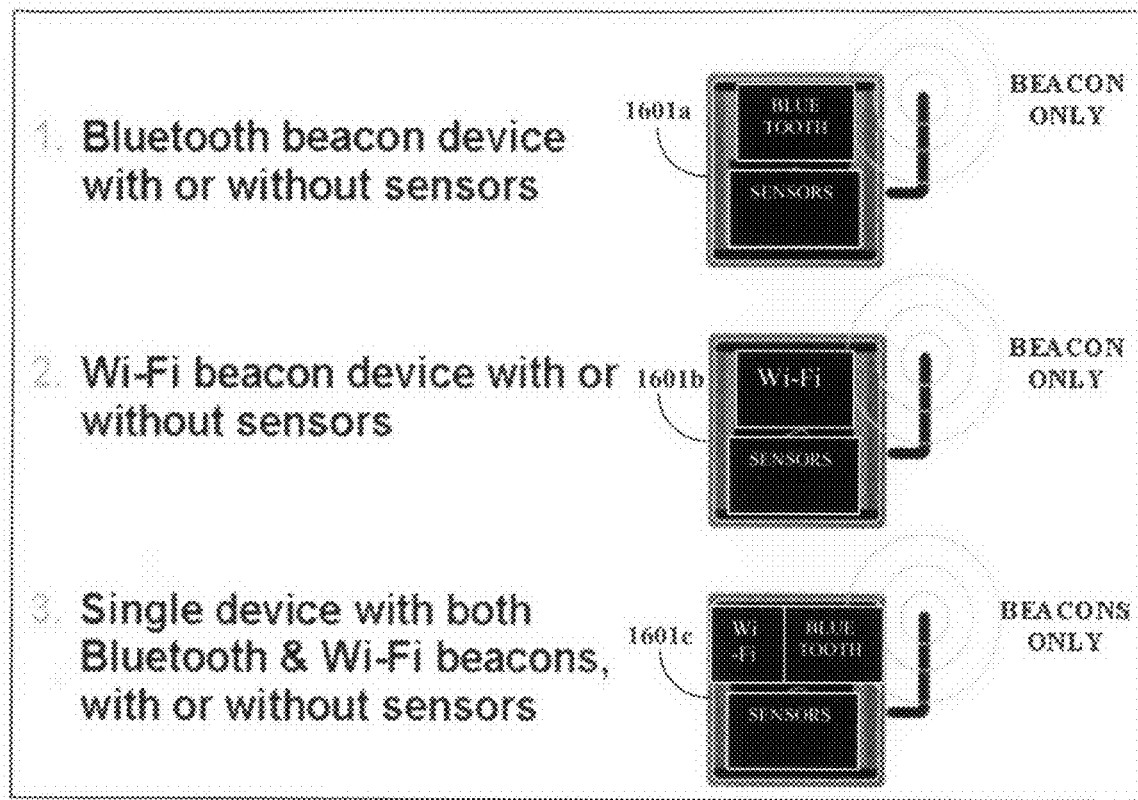
FIG. 16 illustrates the wireless and hardware options of the beacon devices.

FIG. 15 illustrates the system for disseminating environment and proximity aware information and advertisements to a mobile device user 701 from a data server 1502 on detection of beacon devices 1501 by the client application 702. The system disclosed herein comprises the client application 702, the beacon devices 1501, and the data server 1502. The beacon devices 1501 may be implemented with the wireless and hardware options illustrated in FIG. 16. As illustrated in FIG. 16, each of the beacon devices 1501 may be a Bluetooth® radio beacon device 1601a with or without sensors 804, a Wi-Fi radio beacon device 1601b with or without sensors 804, or a single wireless radio beacon device with both the Bluetooth beacon and the Wi-Fi beacon 1601c with or without sensors 804. The beacon device 1501 may be powered through a power 803 socket or by a battery.

The client application 702 detects the presence of the beacon devices 1501 using one of a Bluetooth wireless protocol, a Wi-Fi protocol, and WiMAX technology. The client application 702 comprises a GUI 702a, a base station sensor device/GPS service detection and selection module 702b, a solicitation filter module 702c, a categorization engine 702d, and an address and sensor information capture module 702e. The client application 702 displays the environment and proximity aware information and advertisements to the mobile device user 701 on the GUI 702a. The base station sensor device/GPS service detection and selection module 702b detects and selects the beacon devices 1501 with Bluetooth, Wi-Fi, and WiMAX capabilities. The base station sensor device/GPS service detection and selection module 702b further identifies and discards the non base station sensor devices from a plurality of devices with Bluetooth, Wi-Fi, and WiMAX capabilities.

The beacon devices 1501 comprise environmental sensors 703b for capturing environmental data of a region surrounding the beacon devices 1501. The address and sensor information capture module 702e captures and transfers the address information of the detected beacon devices 1501 and encoded sensor information to the data server 1502. The address and sensor information capture module 702e transfers the address information and the encoded sensor information using the wireless internet service based on one of GSM technology and CDMA technology. The address information comprises the SSID and the MAC address information. The data server 1502 determines proximity of the mobile device user 701 to the respective beacon devices 1501 using the address information transferred by the address and sensor information capture module 702e. The encoded sensor information comprises environmental data captured by the environmental sensors 703b.

The delivery engine 703e of the data server 1502 then transfers high level information of service offerings of the vendors to the client application 702 from the data server 1502 using the wireless internet service based on one of GSM technology and CDMA technology. The solicitation filter module 702c filters the solicitation messages comprising the service offerings of the vendors in the client application 702 based on filter criteria. The categorization engine 702d of the client application 702 is explained in the detailed description of FIG. 7. The data server 1502 comprises an environmental data storage module 1502a, a business information configuration tool 703c, an information correlator 703d, the delivery engine 703e, a statistical information collector module 703f, and an information database 1502b.

The environmental data storage module 1502a stores the environmental data transferred by the client application 702 to the data server 1502.

The vendors configure the business information and advertisements using the business information configuration tool 703c as illustrated in FIGS. 14A-14D. The vendors may enter the serial number of the beacon devices 1501 along with the business information and advertisements using the business information configuration tool 703c illustrated in FIGS. 14A-14D. The business information and advertisements configured by the vendors are stored on the data server 1502 in the information database 1502b. The information correlator 703d and the statistical information collector module 703f have been explained in the detailed description of FIG. 7. The delivery engine 703e transfers the business information and advertisements correlated by the information correlator 703d to the client application 702 using the wireless internet service based on one of GSM technology and CDMA technology. The information database 1502b comprises the service offerings of the vendors, the business information and advertisements of the vendors, and address information of the beacon devices 1501, the local time data, the correlated information and advertisements, and the statistical information.

Figure 18:
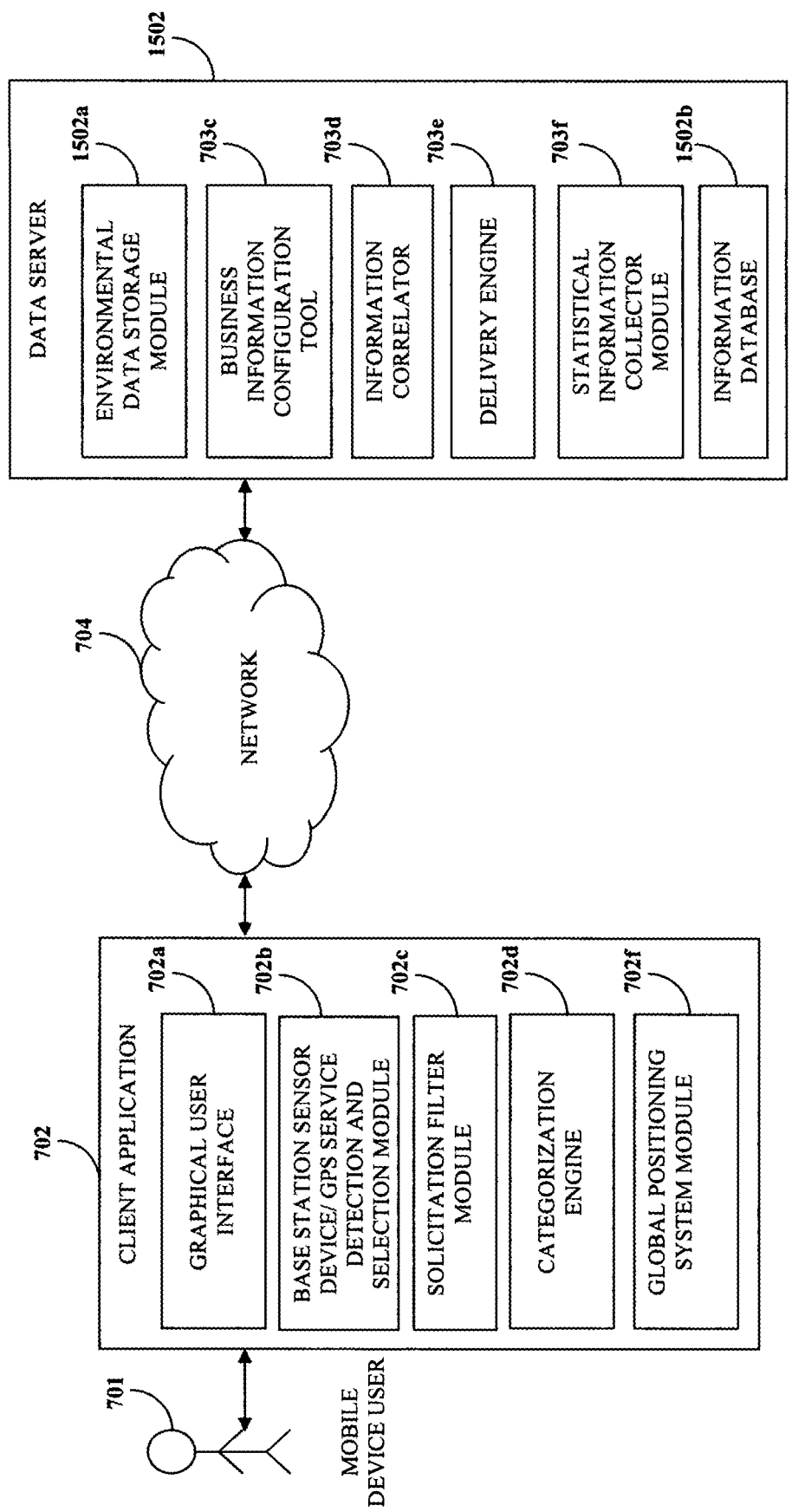
FIG. 18 illustrates a system for disseminating environment and proximity aware information and advertisements to a user of a mobile device with global positioning system capabilities.

FIG. 18 illustrates a system for disseminating environment and proximity aware information and advertisements to a user 701 of a mobile device with global positioning system capabilities. The system disclosed herein comprises a client application 702 on the mobile device with GPS capabilities and a data server 1502. The mobile device user 701 configures a proximity range on the client application 702 for obtaining service offerings information from vendors of interest in the proximity range. The client application 702 comprises a GUI 702a, a base station sensor device/GPS service detection and selection module 702b, a solicitation filter module 702c, a categorization engine 702d, and a GPS module 702f. The base station sensor device/GPS service detection and selection module 702b detects the GPS based service. The base station sensor device/GPS service detection and selection module 702b further identifies and discards the non-GPS based services. The GPS module 702f transfers GPS coordinates of the mobile device and the proximity range to the data server 1502 using a wireless internet service based on one of GSM technology and CDMA technology. The GPS coordinates may be longitude, latitude, and the default or selectable proximity parameters. The selected proximity range may be, for example, 100 meters, 200 meters, 1 mile, etc.

The data server 1502 reverse geocodes the GPS coordinates to determine the location of the mobile device user 701. The location of the mobile device user 701 may comprise the street, zip code, city, state, and country of the mobile device user 701. The data server 1502 uses the location and the proximity range to determine the vendors in proximity to the mobile device user 701. Vendors enter address information of businesses of the vendors on the data server 1502 using the business information configuration tool 703c illustrated in FIGS. 14A-14D. Vendors may also enter the range of visibility of the mobile device user 701 to the businesses. The data server 1502 geocodes the address information to determine the vendors located within the proximity range configured on the client application 702. The delivery engine 703e of the data server 1502 transfers the service offerings information of the vendors to the client application 702 using a wireless internet service based on one of GSM technology and CDMA technology.

The categorization engine 702d categorizes the transferred information into multiple categories. The categories are listed and displayed on the GUI 702a of the client application 702. The mobile device user 701 selects one or more of the categories. The client application 702 then interacts with the data server 1502 via GSM technology or CDMA technology using HTTP or XML and receives business information and advertisements of the vendors based on the selected categories. The interaction between the client application 702 and data server 1502 using the wireless internet service based on GSM and CDMA is illustrated in FIG. 17.

The data server 1502 comprises an environmental data storage module 1502a, the business information configuration tool 703c, an information correlator 703d, the delivery engine 703e, a statistical information collector module 703f, and an information database 1502b. The environmental data storage module 1502a stores the environmental data obtained from a real time location weather database. The business information configuration tool 703c has been explained in the detailed description of FIG. 7. The business information and advertisements configured by the vendors are stored on the data server 1502 in the information database 1502b. The business information configuration tool 703c, the information correlator 703d, and the statistical information collector module 703f have been explained in the detailed description of FIG. 7. The delivery engine 703e transfers the business information and advertisements correlated by the information correlator 703d to the client application 702 using the wireless internet service based on one of GSM technology and CDMA technology.

Figures 19, 20:
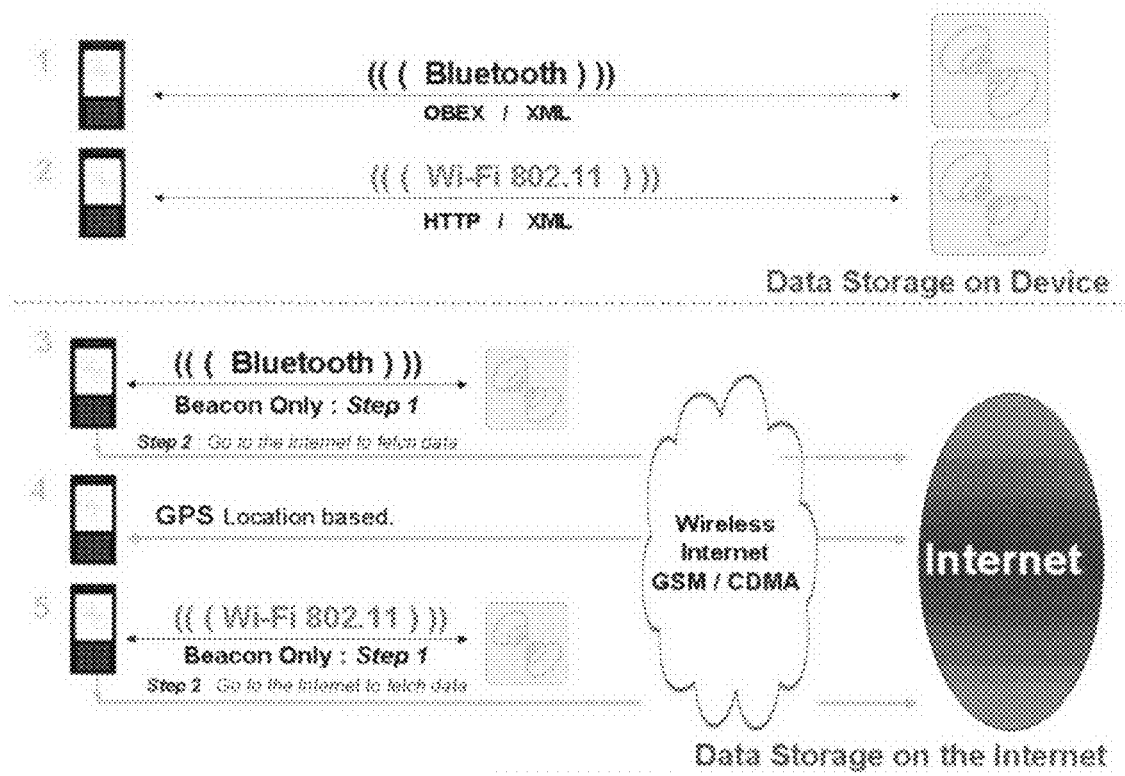
FIG. 19 illustrates the different methods of disseminating environment and proximity aware information and advertisements to a mobile device user.
FIG. 20 illustrates a comparison chart of the different methods of disseminating environment and proximity aware information and advertisements to a mobile device user.

FIG. 19 illustrates the different methods of disseminating environment and proximity aware information and advertisements to a mobile device user 701. Option 1 and option 2 of FIG. 19 illustrate the method of disseminating environment and proximity aware information and advertisements to the mobile device user 701 from a standalone base station device 703 using the Bluetooth wireless protocol and the Wi-Fi protocol respectively. Option 3 and option 5 illustrate the method of disseminating environment and proximity aware information and advertisements to the mobile device user 701 from the data server 1502 using the Bluetooth wireless protocol and the Wi-Fi protocol respectively. Option 4 of FIG. 19 illustrates the non-spamming dissemination of environment and proximity aware information and advertisements from the data server 1502 to the user 701 of a mobile device with GPS capabilities. FIG. 20 illustrates a comparison chart of the different methods of disseminating environment and proximity aware information and advertisements to the mobile device user 701.

Figure 23:
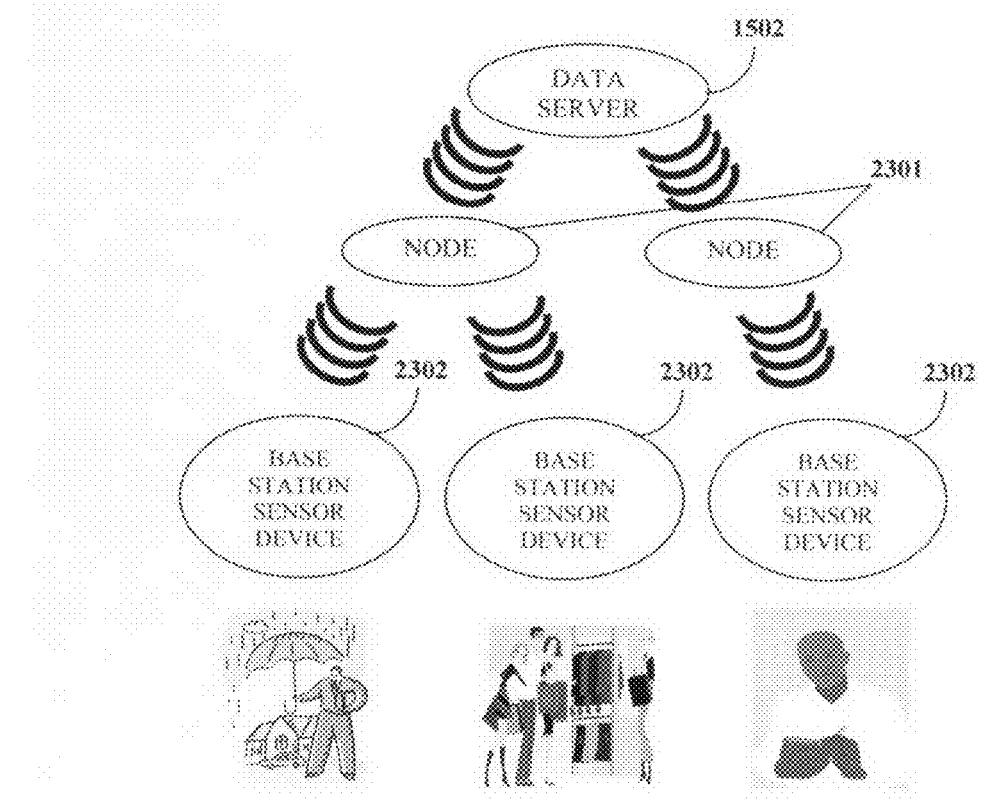
FIG. 23 exemplarily illustrates a sensor network comprising a plurality of base station sensor devices.

FIG. 23 exemplarily illustrates a sensor network comprising a plurality of base station sensor devices 2302. The sensor network may be a Bluetooth, Wi-Fi, or WiMAX scatter network comprising a plurality of base station sensor devices 2302. The base station sensor devices 2302 may be the standalone base station devices 703 and the beacon devices 1501. The sensor network is set up between the plurality of base station sensor devices 2302 and the data server 1502 through nodes 2301. The sensor network may be used as a distributed content storage network for storing information, advertisements and multimedia content. The sensor network enables complex content to be delivered from one base station sensor device with large storage to multiple base station sensor devices 2302 in the sensor network. The data server 1502 in this case may also be a base station sensor device with large storage capacity, for example, either in a 200 to 500 megabyte flash memory 1104, or a 20 gigabyte hard disk. The sensor network may also be used to collect statistical information from the plurality of base station sensor devices 2302. The statistical information comprises remote environmental conditions such as temperature, humidity, air pressure, and patterns of movements of the mobile device user 701.

The base station sensor devices 2302 may be developed utilizing the Bluetooth wireless protocol standard 2.0 or greater. In the case of Wi-Fi, the base station sensor devices 2302 may be developed utilizing 802.11b, g, or n protocols. The base station sensor devices 2302 support the basic Bluetooth Object Push profile, HTTP, or XML for electronic mobile devices without the client application 702, or the Network Access or Serial Device profile for the mobile devices running the client application 702. The base station sensor devices 2302 render maximum performance in a wide open area with the mobile device user 701 as the only obstruction with least interference from existing Wi-Fi, Bluetooth, or other unlicensed radio frequency spectrum users. Moreover, the mobile device user 701 needs to be within the radio frequency range of the base station sensor devices 2302 while communicating with the base station sensor devices 2302.

The method and system disclosed herein may be implemented in technologies that are pervasive, flexible, and capable of accomplishing the desired tasks of the disclosed method and system. The electronic mobile device may be a ubiquitous mobile device. The use of personal digital assistants (PDAs) without telephony support is also fairly widespread. The client application 702 may be deployed on such devices with limited or no telephony support. These mobile devices may support Java of Sun Microsystems Inc., more specifically Java 2 Micro Edition (J2ME™), Windows Mobile .Net Compact Framework of Microsoft, Inc., Symbian™, Linux framework. The client application 702 may be implemented on the J2ME platform. These environments provide functionalities in the libraries to create the GUI 702a and perform all the required functions of the method and system disclosed herein. Another advantage of these frameworks is portability across mobile devices that run on different operating systems. The client application 702 may be rendered independent of the operating system of the mobile device.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the information database 1502b, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of non-spamming dissemination of proximity aware information to a user of a portable device, comprising:
   requesting, by a portable device, solicitations associated with services or products provided by a plurality of vendors in a vicinity of a plurality of base station devices from the plurality of base station devices by using a Bluetooth wireless protocol;
   receiving, by the portable device, the solicitations associated with services or products provided by the plurality of vendors in the vicinity of the plurality of base station devices from the plurality of base station device, wherein the portable device receives an uncategorized solicitation including a uniform resource locator from each of the plurality of base station devices through the Bluetooth wireless protocol;
   filtering, by the portable device, the solicitations associated with services or products provided by the plurality of vendors in the vicinity of the plurality of base station devices and received from the plurality of base station devices according to filtering criteria configured in the portable device;
   categorizing, by using a categorization engine comprised in a client application on the portable device, the filtered solicitations into multiple categories;
   displaying, by the portable device, the filtered solicitations on a screen formed in the portable device, wherein the filtered solicitations for the services or products provided by the plurality of vendors in the vicinity of the plurality of base station devices are displayed as categorized into the multiple categories by using the categorization engine comprised in the client application on the portable device;
   receiving, by the portable device, an input for selecting a solicitation from the filtered solicitations displayed on the screen formed in the portable device;
   receiving, by the portable device, additional detailed advertising information corresponding to the selected solicitation from a data server through a wireless internet service by using the uniform resource locator included in the selected solicitation, wherein the additional detailed advertising information received from the data server through the wireless internet service corresponds to one of the solicitations received from the plurality of base station devices through the Bluetooth wireless protocol; and
   displaying, by the portable device, the additional detailed advertising information corresponding to the selected solicitation on the screen formed in the portable device.

2. The method of claim 1, wherein the filtered solicitations from the plurality of vendors are displayed on the screen simultaneously.

3. The method of claim 1, wherein, if a solicitation from a first list of solicitations categorized in a first level is selected, a list of additional advertising information of a second level is displayed on the screen.

4. The method of claim 1, wherein a solicitation filter according to the filtering criteria is configured in the portable device by a user of the portable device based on preferences of the user.

5. The method of claim 1, wherein a solicitation filter according to the filtering criteria is configured in the portable device by a user of the portable device based on preferences of the user,
   wherein the solicitation filter is enabled or disabled on a graphic user interface formed on the screen of the portable device.

6. The method of claim 1, wherein the additional advertising information is customized based on environmental conditions including at least one of temperature, humidity, air pressure, chance of rain, time and day of a week.

7. The method of claim 1, wherein the portable device can display a saved solicitation or delete the saved solicitation.

8. The method of claim 1, wherein the additional advertising information is configured by the vendors using a business information configuration tool and stored on at least one of the base station device and on the data server, wherein the data server is used for one of beacon devices and a global positioning system based information and advertisements dissemination service for portable devices with global positioning system capabilities.

9. The method of claim 1, wherein the portable device sends a message to the plurality of base station devices such that the plurality of base station devices gather contact information, phone number and feedback from the user of the portable device.

10. The method of claim 1, wherein the portable device receives a request for an electronic business card of the user of the portable device from the plurality of base station devices such that the electronic business card is added to contact lists, raffles, or call backs.

11. A portable device for non-spamming dissemination of proximity aware information to a user of the portable device, comprising:
   a screen configured to display solicitations associated with services or products provided by a plurality of vendors in a vicinity of a plurality of base station devices; and
   a processor configured to:
      filter the solicitations for the services or products provided by the plurality of vendors in the vicinity of the plurality of base station devices and received by using a Bluetooth wireless protocol from the plurality of base station devices according to filtering criteria configured in the portable device, wherein the portable device receives an uncategorized solicitation including a uniform resource locator from each of the plurality of base station devices through the Bluetooth wireless protocol,
      categorize the filtered solicitations for the services or products provided by the plurality of vendors in the a vicinity of the plurality of base station devices into multiple categories by the processor using a categorization engine comprised in a client application on the portable device, display the filtered solicitations on the screen as categorized into the multiple categories by using the categorization engine comprised in the client application, receive an input for selecting a solicitation from the filtered solicitations displayed on the screen formed in the portable device, receive additional detailed advertising information from a data server through a wireless internet service by using the uniform resource locator included in the selected solicitation, wherein the additional detailed advertising information corresponds to the selected solicitation from the filtered solicitations displayed on the screen, wherein the additional detailed advertising information received from the data server through the wireless internet service corresponds to one of the solicitations received from the plurality of base station devices through the Bluetooth wireless protocol, and display the additional detailed advertising information corresponding to the selected solicitation on the screen.

12. The portable device of claim 11, wherein a solicitation filter according to the filtering criteria is configured in the portable device by a user of the portable device based on preferences of the user.

13. The portable device of claim 11, wherein a solicitation filter according to the filtering criteria is configured in the portable device by a user of the portable device based on preferences of the user, and wherein the solicitation filter can be enabled or disabled on a graphic user interface formed on the screen of the portable device.

14. The portable device of claim 11, wherein a solicitation filter according to the filtering criteria is configured in the portable device by a user of the portable device based on preferences of the user, wherein the solicitation filter can be enabled or disabled on a graphic user interface formed on the screen of the portable device, and wherein, if the solicitation filter is enabled, a list including solicitations meeting the filter criteria is displayed on the screen of the portable device, and if the solicitation filter is disabled, a list including all solicitations available in an area in vicinity of the at least one base station device is displayed on the screen of the portable device.

15. The portable device of claim 11, wherein the filtered solicitations from the plurality of vendors are displayed on the screen simultaneously.

16. The portable device of claim 11, wherein, if a solicitation from a first list of solicitations categorized in a first level is selected, a list of additional advertising information of a second level is displayed on the screen.

17. The portable device of claim 11, wherein the additional advertising information is customized based on environmental conditions including at least one of temperature, humidity, air pressure, chance of rain, time and day of a week.

18. A non-transitory computer readable medium encoded with computer executable instructions that, when executed, cause a portable terminal to perform the steps of:

requesting, by a portable device, solicitations associated with services or products provided by a plurality of vendors in a vicinity of a plurality of base station devices to the plurality of base station devices by using a Bluetooth wireless protocol;

receiving, by the portable device, the solicitations associated with services or products provided by the plurality of vendors in the vicinity of the plurality of base station devices from the plurality of base station devices, wherein the portable device receives an uncategorized solicitation including a uniform resource locator from each of the plurality of base station devices through the Bluetooth wireless protocol;

filtering, by the portable device, the solicitations associated with services or products provided by the a plurality of vendors in the vicinity of the plurality of base station devices and received from the plurality of base station devices according to filtering criteria configured in the portable device;

categorizing, by using a categorization engine comprised in a client application on the portable device, the filtered solicitations into multiple categories;

displaying, by the portable device, the filtered solicitations on a screen formed in the portable device, wherein the filtered solicitations for the services or products provided by the plurality of vendors in the vicinity of the plurality of base station devices are displayed as categorized into the multiple categories by using the categorization engine comprised in the client application on the portable device;

receiving, by the portable device, an input for selecting a solicitation from the filtered solicitations displayed on the screen formed in the portable device;

receiving, by the portable device, additional detailed advertising information corresponding to the selected solicitation from a data server through a wireless internet service by using the uniform resource locator included in the selected solicitation; and displaying, by the portable device, the additional detailed advertising information corresponding to the selected solicitation on the screen formed in the portable device, wherein the additional detailed advertising information received from the data server through the wireless internet service corresponds to one of the solicitations received from the plurality of base station devices through the Bluetooth wireless protocol.

* * * * *